(12) United States Patent
Hasek, IV et al.

(10) Patent No.: US 11,489,923 B2
(45) Date of Patent: *Nov. 1, 2022

(54) NETWORK CONTROLLED CONTENT RECORDING USING NETWORK AND LOCAL STORAGE

(71) Applicant: T-Mobile USA, Inc., Bellevue, WA (US)

(72) Inventors: Charles A. Hasek, IV, Denver, CO (US); Jeffrey Binder, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/326,834

(22) Filed: May 21, 2021

(65) Prior Publication Data

US 2021/0281644 A1 Sep. 9, 2021

Related U.S. Application Data

(63) Continuation of application No. 16/503,044, filed on Jul. 3, 2019, now Pat. No. 11,050,824.
(Continued)

(51) Int. Cl.
| | |
|---|---|
| *H04L 67/1097* | (2022.01) |
| *H04N 21/258* | (2011.01) |
| *H04N 21/274* | (2011.01) |
| *H04N 21/433* | (2011.01) |
| *H04L 65/612* | (2022.01) |
| *H04L 65/75* | (2022.01) |
| *H04L 67/50* | (2022.01) |

(Continued)

(52) U.S. Cl.
CPC ........ *H04L 67/1097* (2013.01); *H04L 65/612* (2022.05); *H04L 65/764* (2022.05); *H04L 67/535* (2022.05); *H04L 67/563* (2022.05); *H04L 67/564* (2022.05); *H04N 21/25891* (2013.01); *H04N 21/274* (2013.01); *H04N 21/4334* (2013.01)

(58) Field of Classification Search
None
See application file for complete search history.

(56) References Cited

U.S. PATENT DOCUMENTS

| | | |
|---|---|---|
| 8,572,659 B2 | 10/2013 | Fyock et al. |
| 8,615,164 B1 | 12/2013 | Kotab et al. |
| | (Continued) | |

*Primary Examiner* — Jeffrey R Swearingen
(74) *Attorney, Agent, or Firm* — Brownstein Hyatt Farber Schreck, LLP

(57) ABSTRACT

A storage controller of a network controlled content recording system that uses a combination of network and local storage determines to record content for a user. The storage controller performs an evaluation to determine whether to store the content in network or local storage. The evaluation may include evaluating a set of rules and/or characteristics of the user, characteristics of the content, characteristics of a request to record the content, and so on. The storage controller then arranges for the content to be recorded accordingly. Subsequently, the storage controller may reevaluate storage locations and direct transfer accordingly. This reevaluation may include determining that various characteristics related to the user, the content, and so on have changed and that transfer is appropriate due to that change.

20 Claims, 22 Drawing Sheets

Related U.S. Application Data

(60) Provisional application No. 62/696,799, filed on Jul. 11, 2018.

(51) Int. Cl.
*H04L 67/563* (2022.01)
*H04L 67/564* (2022.01)

(56) References Cited

U.S. PATENT DOCUMENTS

| | | |
|---|---|---|
| 10,382,821 B1 | 8/2019 | McCarty et al. |
| 10,623,817 B1 | 4/2020 | Gravino et al. |
| 11,171,950 B1 * | 11/2021 | Zhuravlev .............. H04L 67/141 |
| 11,294,588 B1 * | 4/2022 | Miller ................... G06F 3/0641 |
| 11,379,254 B1 * | 7/2022 | Karumbunathan .......................... G06F 9/45558 |
| 2007/0104456 A1 | 5/2007 | Craner et al. |
| 2007/0174471 A1 | 7/2007 | Van Russum et al. |
| 2011/0293251 A1 | 12/2011 | Roberts et al. |
| 2013/0238777 A1 | 9/2013 | Raleigh et al. |
| 2014/0270713 A1 | 9/2014 | Hybertson et al. |

\* cited by examiner

NETWORK CONTROLLED CONTENT RECORDING USING NETWORK AND LOCAL STORAGE

CROSS-REFERENCE TO RELATED APPLICATION(S)

This application is a continuation patent application of U.S. patent application Ser. No. 16/503,044, filed Jul. 3, 2019 and titled "Network Controlled Content Recording Using Network and Local Storage," now U.S. Pat. No. 11,050,824, which is a nonprovisional patent application of and claims the benefit of U.S. Provisional Patent Application No. 62/696,799, filed Jul. 11, 2018 and titled "Network Controlled Content Recording Using Network and Local Storage," the disclosures of which are hereby incorporated herein by reference in their entireties.

FIELD

The described embodiments relate generally to content recording systems. More particularly, the present embodiments relate to a network controlled content recording system that uses a combination of network and local storage.

BACKGROUND

Content providers may make a variety of different content available to users via a variety of different content access devices. For example, cable television providers may allow customers to access terrestrial or satellite television broadcasts through set top boxes. The television broadcasts may be transmitted on particular channels at particular times. In order to access a particular television broadcast, a customer may tune their set top box to the respective particular channel at the respective particular time.

Various technologies enable users to record content. This may enable users to watch television broadcasts at times other than the broadcast time, watch television programs more than once, and so on. Examples of these technologies include video cassette recorders, digital video recorders, and so on.

Some content recording devices, such as a personal digital video recorder ("DVR"), may store recorded content in a local storage medium, such as a memory or hard drive. These content recording devices may also function as content access devices for the content they store. Local storage may enable quick access to stored content. Other content recording devices, such as a network digital video recorder, may store recorded content for one or more different users in one or more storage media accessible from a content access device via a network. Network storage may be flexible in that additional storage may be allocated and added without requiring users to replace their content access devices.

SUMMARY

The present disclosure relates to a network controlled content recording system that uses a combination of network and local storage. A storage controller may determine to record content for a user. The storage controller may perform an evaluation to determine whether to store the content in a device local to the user or in network storage. The evaluation may include evaluating a set of rules and/or the content, user behavior, characteristics of the user, characteristics of the content, characteristics of a request to record the content, and so on. The storage controller may then arrange for the content to be recorded accordingly. Subsequently, the storage controller may reevaluate storage locations and direct transfer accordingly. This reevaluation may include determining that various characteristics related to the user, the content, and so on have changed and that transfer is appropriate due to that change.

In various implementations, a content recording system includes a non-transitory storage medium that stores instructions and a processing unit. The processing unit executes the instructions to receive a content recording request, evaluate the content recording request according to a set of rules, and determine whether to record content associated with the content recording request in a user device or in network storage based on the set of rules.

In some examples, the set of rules is based on monitored user behavior. In various examples, the set of rules is generated by modifying a rule template for a general population of users using monitored user behavior.

In numerous examples, the set of rules specifies to store first content in the user device, the set of rules specifies to store second content in the network storage, and the first content is more likely to be accessed than the second content. In some examples, the processing unit stores a first portion of the content in the user device, stores a second portion of the content in the network storage, and moves the second portion of the content to the user device when the first portion of the content is accessed. In various examples, the processing unit determines a change occurs and moves the content between the user device and the network storage based on the change.

In some examples, the user device is a first user device and the processing unit determines whether to record the content in the user device, in a second user device, or in the network storage based on the set of rules. In various examples, the network storage is a first storage tier with a first characteristic and a second storage tier with a second characteristic. In such examples, the processing unit determines whether to record the content in the user device, in the first tier of the network storage, or the second tier of the network storage.

In some implementations, a storage controller for a content recording system includes a non-transitory storage medium that stores instructions and a processing unit. The processing unit executes the instructions to receive a content recording request, evaluate content associated with the content recording request, evaluate user behavior associated with the content recording request, and determine whether to record content associated with the content recording request in a user device or in network storage based on the content and the user behavior.

In various examples, the processing unit determines whether to record the content associated with the content recording request in the user device or in the network storage based on whether the content is time related. In some examples, the processing unit determines whether to record the content associated with the content recording request in the user device or in the network storage based on whether the content recording request includes a specific instruction to record the content. In numerous examples, the processing unit determines whether to record the content associated with the content recording request in the user device or in the network storage based on whether the content is recorded as part of a series recording. In some examples, the processing unit determines whether to record the content associated with the content recording request in the user device or in the network storage based on whether the content is related to frequently watched content. In various examples, the processing unit determines whether to record the content associated with the content recording request in the user device or in the network storage based on whether the content is popular. In numerous examples, the processing unit determines whether to record the content associated with the content recording request in the user device or in the network storage based on whether the content recently aired. In various examples, the processing unit determines whether to record the content associated with the content recording request in the user device or in the network storage based on whether the content is an episode in a series and a previous episode of the series has been accessed.

In various implementations, a storage controller includes a non-transitory storage medium that stores instructions and a processing unit. The processing unit executes the instructions to receive a content recording request, determine that recording content for the content recording request in an individual storage pool associated with the content recording request in a network storage would result in a duplicate copy, determine whether shared storage of the content is allowed, and, if shared storage of the content is allowed, store the content in a shared storage pool in the network storage.

In some examples, the processing unit stores the content in the individual storage pool associated with the content recording request if shared storage of the content is not allowed. In various examples, the processing unit moves the content from the individual storage pool to the shared storage pool in the network storage after a time window. In numerous examples, the processing unit replaces an advertisement included in the content stored in the network storage with a current advertisement.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
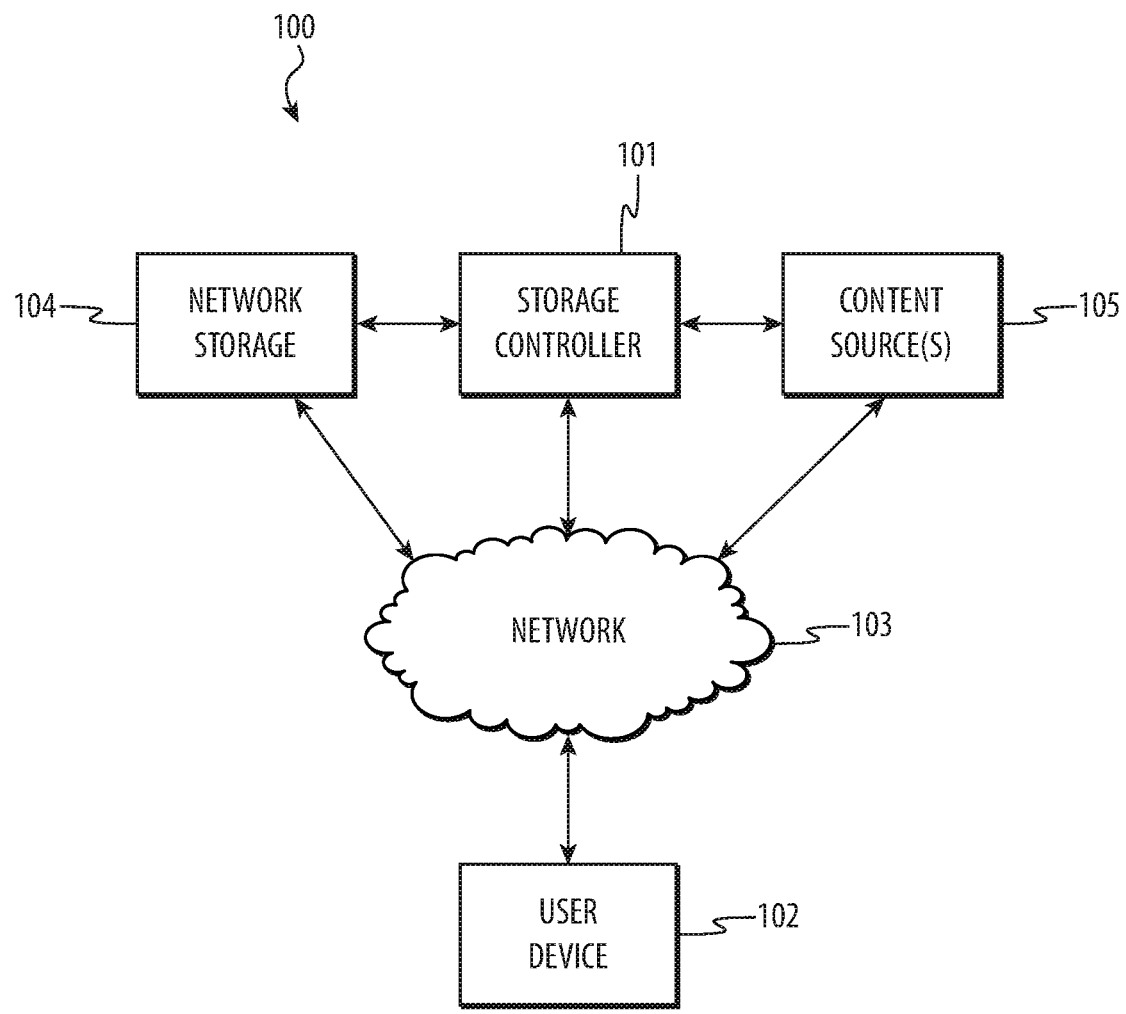
FIG. 1 depicts a first example of a network controlled content recording system that uses a combination of network and local storage.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, apparatuses, methods, and computer program products that embody various elements of the present disclosure. However, it should be understood that the described disclosure may be practiced in a variety of forms in addition to those described herein.

Content recording systems that store recorded content in a local device at a user's location may respond quickly to requests for stored content. Network data speeds may be faster than ever before, but data retrieval from local storage is still typically faster. However, a local device, such as a DVR, typically has a limited amount of storage. A user may have to replace the local device or have technicians replace the local device's storage device(s) in order to increase the amount of storage.

Network storage may be very flexible. A number of storage devices, such as a group of servers or other devices configured in a cloud computing or other cooperating computing arrangement, may be configured to store recorded content for one or more users. The storage devices may be configured to provide access to the stored content via one or more network connections. This configuration may be flexible as the amount of storage available for a particular user may be changed at any time without requiring the user to replace or modify the user's personal equipment. More space in current storage devices may be allocated to the user, additional storage devices may be added to the network storage, additional storage may be added to existing storage devices, and so on. This may all be invisible to users other than the awareness that they are able to store more content than was previously possible. However, network storage systems may not respond to requests for stored content as quickly as local storage systems as the network storage system transmits the requested content over a network connection. This may cause delays. Further, users may be unable to access stored content if network access is interrupted.

An example hybrid system may be configured to use a combination of local and network storage for recording content. In some examples, content may be stored locally until local storage runs out. Additional content may then be stored in network storage. However, this may not account for which content a user is most likely to access. Users may frequently access content stored in the network and infrequently access content stored locally. This may result in delays that could have been avoided. Further, this may not leave any local storage available for locally storing new content that may be better stored locally rather than in the network.

A more efficient example hybrid system may move locally stored content to the network after it has been stored for a period of time. For example, the system may assume that a user is less likely to access content stored for over a week and more than content from local storage to network storage, freeing up local storage. This would adjust the hybrid system to store more likely accessed content locally and less likely accessed content in the network than the previously mentioned hybrid system. However, this second example system still stores the less likely accessed content locally for the period of time before transferring it to network storage. If the system had been better able to estimate beforehand which content should be stored locally and which remote, the system could have stored content more efficiently.

The following disclosure relates to a network controlled content recording system that uses a combination of network and local storage. Upon determining to record content for a user, a storage controller of the network controlled content recording system performs an evaluation to determine whether to store the content in a device local to the user or in network storage. The storage controller may then arrange for the content to be recorded accordingly. The storage controller may evaluate a set of rules and/or may evaluate the content, user behavior, characteristics of the user, characteristics of the content, characteristics of a request to record the content, and so on. Subsequently, the storage controller may reevaluate storage locations and direct transfer accordingly. For example, the storage controller may determine that various characteristics related to the user, the content, and so on have changed. When the storage controller determines a change occurs, the storage controller may determine that transfer is appropriate due to that change.

In this way, the network controlled content recording system may be capable of providing a virtually unlimited amount of content recording space while providing access to recorded content as quickly and efficiently as possible. The network controlled content recording system may therefore optimize storage, reduce time required to access content, automate storage decisions, improve operating efficiency of the devices included in the system, and reduce system resources used in storing and providing access to content.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 depicts a first example of a network controlled content recording system 100 that uses a combination of network and local storage. The system 100 includes one or more storage controllers 101 (such as a single computing device, multiple computing devices operating in a cooperative computing arrangement, and so on), one or more user devices 102 (such as a set top box and/or any kind of computing device or content access device), and a network storage 104 that may be configured to communicate with each other, such as through one or more communication networks 103.

The storage controller 101 may determine to record content. The storage controller 101 may perform an evaluation to determine whether to store the content in the user device 102 (e.g., local storage) and/or the network storage 104. The storage controller 101 may then arrange for the content to be recorded accordingly.

In some situations, the storage controller 101 may store various instances of content in both the user device 102 and the network storage 104. In other situations, the storage controller 101 may store all content in either the user device 102 or the network storage 104. Various configurations are possible and contemplated without departing from the scope of the present disclosure.

The storage controller 101 may evaluate a set of rules to determine whether to store the content in the user device 102 and/or the network storage 104. The set of rules may be any kind of organized process the storage controller 101 follows to determine whether to store the content in the user device 102 and/or the network storage 104. Additionally or alternatively, the storage controller 101 may evaluate the content, user behavior, characteristics of the user, characteristics of the content, characteristics of a request to record the content, and so on to determine whether to store the content in the user device 102 and/or the network storage 104.

For example, the storage controller 101 may be operated by a content provider network that provides content from one or more content sources 105 (such as terrestrial or satellite broadcast television programs or movies, streaming content, on demand content, and so on) to content access devices in user homes. The storage controller 101 may receive a content recording request from the user device 102. The content recording request may specify to record content available from the content source 105 (such as video, audio, one or more images, and/or any other kind of content). The content recording request may specify to record the content immediately or at a time in the future. The storage controller 101 may evaluate a set of rules, characteristics regarding the content specified by the content recording request, the content recording request, characteristics about a user related to the content recording request monitored by the user device 102 and/or the storage controller 101, a time the content recording request was submitted, a time associated with the content, and/or other information. Based on the evaluation, the storage controller 101 may determine to store the content in the user device 102 and/or the network storage 104. The storage controller 101 may then schedule and/or arrange for the content to be recorded accordingly.

For example, the storage controller 101 may determine that the content recording request is for a television program that the user frequently accesses shortly after recording. As such, the storage controller 101 may determine to record the television program in the user device 102. By way of another example, the storage controller 101 may determine that the content recording request is for a program series that the user watches infrequently. As such, the storage controller 101 may determine to record the program series in the network storage 104. By way of another example, the storage controller 101 may determine that the content recording request is for a live sports program. As such, the storage controller 101 may determine to record the television program in the user device 102. In still another example, the storage controller 101 may determine that the content recording request is for a television program that aired months prior. As such, the storage controller 101 may determine to record the television program in the network storage 104.

The storage controller 101 may evaluate a variety of different characteristics about the user and/or the user device 102. The storage controller 101 may monitor these characteristics by monitoring communications received from the user device 102. The storage controller 101 may also receive characteristics monitored by the user device 102. The characteristics may include behavior of one or more users accessing content via the user device 102, content access times, content access locations, seasonal or other variations in behavior, and/or any other characteristics related to how and when users accessed content. The storage controller 101 may determine that a wide variety of characteristics may be relevant to determining locations to store content.

In some implementations, after storage the storage controller 101 may subsequently reevaluate storage locations and direct transfer accordingly. This reevaluation may include determining that various characteristics related to the user, the content, and so on have changed. When the storage controller determines a change occurs, the storage controller may determine that transfer is appropriate due to that change.

For example, the storage controller 101 may record a first unwatched episode of a television program in the user device 102 and the remainder of the season in the network storage 104. A user may then watch the first unwatched episode and delete it from the user device 102. When the storage controller 101 determines that this change occurs, the storage controller 101 may then reevaluate based on these changed conditions and move the next unwatched episode of the television program from the network storage 104 to the user device 102. In some cases of such an example, the storage controller 101 may move the watched episode from the user device 102 to the network storage 104 if the user did not delete the episode after watching. Various configurations are possible and contemplated without departing from the scope of the present disclosure.

Figure 2:
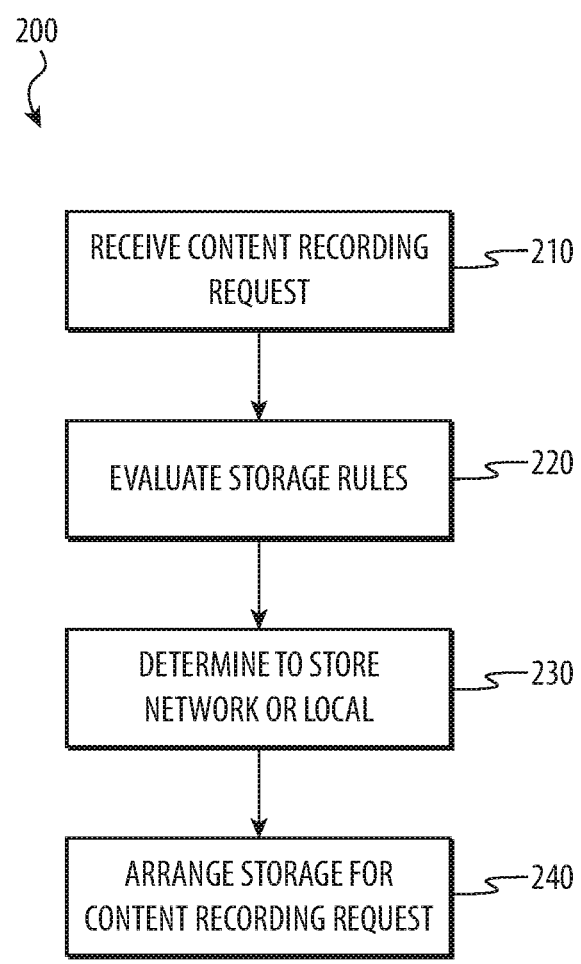
FIG. 2 depicts a flow chart illustrating a first example method for network controlled content recording. This method may be performed by the system of FIG. 1.

FIG. 2 depicts a flow chart illustrating a first example method 200 for network controlled content recording. This method 200 may be performed by the system 100 of FIG. 1.

The flow begins at 210 where a content recording request is received. The flow proceeds to 220 where a set of rules, such as storage rules, are evaluated. The flow then proceeds to 230 where it is determined to store in network or local storage based on the evaluation of the set of rules. Next, the flow proceeds to 240 where storage for content associated with the content recording request is arranged according to the determination whether to store in network or local storage.

Although the example method 200 is illustrated and described as including particular operations performed in a particular order, it is understood that this is an example. In various implementations, various orders of the same, similar, and/or different operations may be performed without departing from the scope of the present disclosure.

For example, 240 is illustrated and described as arranging storage for the content recording request. However, in various implementations, arranging storage for the content recording request may include storing content associated with the content recording request. Various configurations are possible and contemplated without departing from the scope of the present disclosure.

In various examples, this example method 200 may be implemented as a group of interrelated software modules or components that perform various functions discussed herein. These software modules or components may be executed by one or more computing devices, such as the storage controller 101 of the system 100 of FIG. 1.

Figure 3:
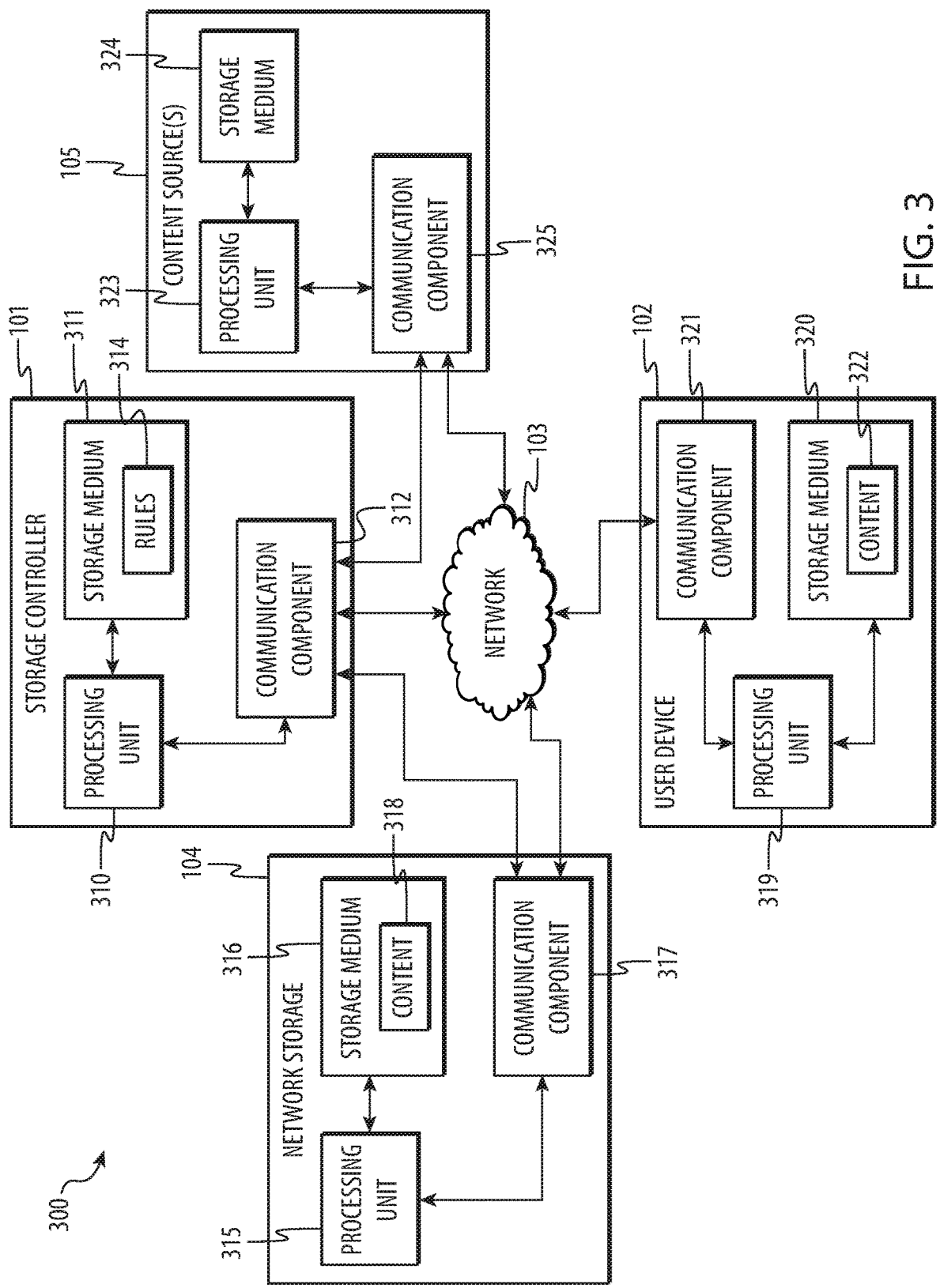
FIG. 3 depicts functional relationships between components of a second example of a network controlled content recording system that uses a combination of network and local storage.

FIG. 3 depicts functional relationships between components of a second example of a network controlled content recording system 300 that uses a combination of network and local storage. The system 300 may include the storage controller 101, the user device 102, the network 103, the network storage 104, and the content source 105.

In this example, the storage controller 101 may include one or more processors or processing units 310, one or more non-transitory storage media 311 (which may take the form of, but is not limited to, a magnetic storage medium; optical storage medium; magneto-optical storage medium; read only memory; random access memory; erasable programmable memory; flash memory; and so on), one or more communication components 312, and/or various other components. The processing unit 310 may execute instructions stored in the storage medium 311 to perform various functions. These functions may include processing content recording requests, determining whether to store content in the user device 102 and/or the network storage 104, arranging for content storage, arranging for obtaining content from the content source 105, communicating with other devices via the communication component 312, and so on. The storage medium 311 may store a set of rules 314 that the storage controller 101 uses to determine whether to store content in the user device 102 and/or the network storage 104. The storage medium 311 may store content characteristics, characteristics of one or more users monitored by the storage controller 101 and/or received from the user device 102, and/or other information.

Similarly, the user device 102 may include one or more processors or processing units 319, one or more non-transitory storage media 320, one or more communication components 321, and/or various other components. The storage medium 320 may store content 322. Likewise, the network storage 104 may include one or more processors or processing units 315, one or more non-transitory storage media 316, one or more communication components 317, and/or various other components. The storage medium 316 may store content 318. In a similar fashion, the content source 105 may include one or more processors or processing units 323, one or more non-transitory storage media 324, one or more communication components 325, and/or various other components.

The set of rules 314 may be configured in a variety of different fashions. For example, in some implementations, the set of rules 314 may specify a first group of procedures to evaluate if a content recording request is related to a specific program to record and a second group of procedures to evaluate if the content recording request is related to a bulk series of related programs to record. The first and second groups of procedures may then include one or more subsets of procedures to evaluate based on various characteristics.

Figure 4A:
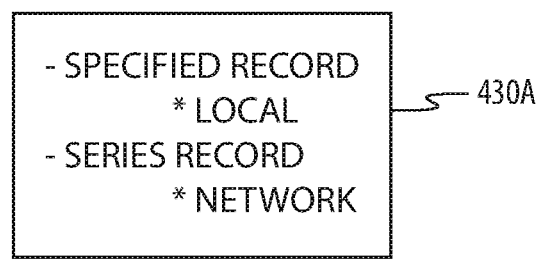
FIG. 4A depicts a first example set of rules that a storage controller may evaluate when recording content in a network controlled content recording system that uses a combination of network and local storage. The storage controller may be the storage controller of the systems of FIGS. 1 and/or 3.

For example, FIG. 4A depicts a first example set of rules 430A that a storage controller may evaluate when recording content in a network controlled content recording system that uses a combination of network and local storage. The storage controller may be the storage controller of the systems 100, 300 of FIGS. 1 and/or 3.

In this example, the set of rules 430A includes a first group of procedures instructing to record in local storage if a content recording request is related to a specific program (such as a specific instruction to record a particular episode of a police drama show). Further, the set of rules 430A includes a second group of procedures instructing to record in network storage if the content recording request is related to a bulk series of related programs to record (such as an instruction to record all episodes of the police drama show). Thus, a storage controller evaluating the set of rules 430A may store specifically requested content in local storage and content related to series recording requests in network storage.

Although the set of rules 430A is illustrated as a list of information, it is understood that the set of rules may be configured in a variety of different ways in various implementations. The set of rules may be written in a markup language such as Extensible Markup Language or XML, Boolean statements, and/or any other format that can be used to specify a set of rules that may be evaluated.

Figure 4B:
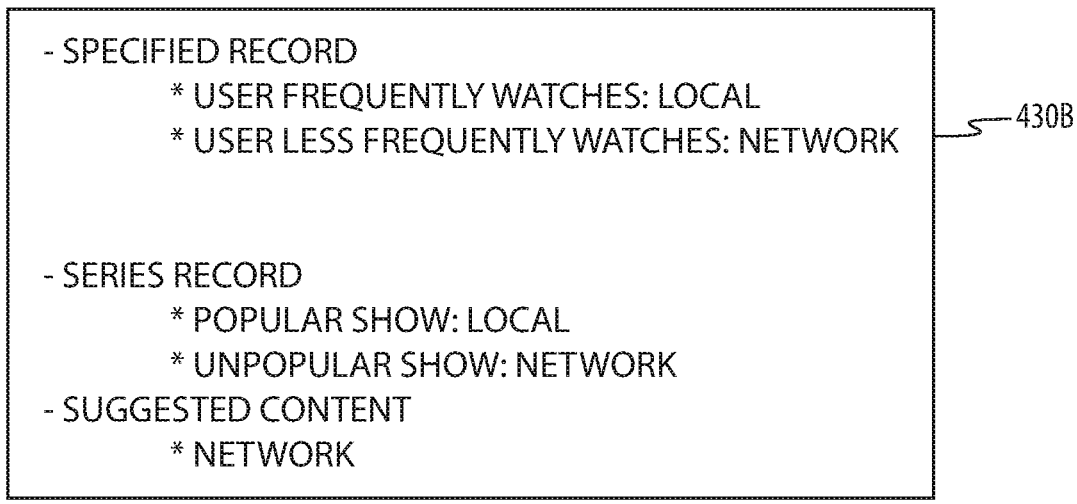
FIG. 4B depicts a second example set of rules that a storage controller may evaluate when recording content in a network controlled content recording system that uses a combination of network and local storage. The storage controller may be the storage controller of the systems of FIGS. 1 and/or 3.

FIG. 4B depicts a second example set of rules 430B that a storage controller may evaluate when recording content in a network controlled content recording system that uses a combination of network and local storage. The storage controller may be the storage controller of the systems 100, 300 of FIGS. 1 and/or 3.

In this example, the set of rules 430B includes a first group of procedures related to specific recording instructions, a second group of procedures related to series recording instructions, and a third group of procedures related to suggested content. Suggested content may be content that is not related to a specific recording request but may be determined to be content that a user is likely to be interested in. The suggested content may be provided to the user as a recommendation, recorded in anticipation that the user will request the suggested content, and so on.

The first group of procedures includes a first procedure instructing storage of specified recordings related to content the user more frequently watches in local storage. The first group of procedures also includes a second procedure instructing storage of specified recordings related to content the user less frequently watches in network storage. Similarly, the second group of procedures includes a first procedure instructing storage of series recordings of popular shows (e.g., a general population of users watch the show as compared to other shows) in local storage and a second procedure instructing storage of series recordings of unpopular shows in network storage. The third group of procedures includes a procedure instruct recording of all suggested content in network storage.

Figure 4C:
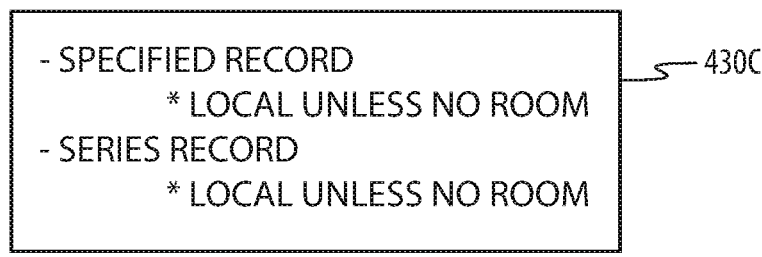
FIG. 4C depicts a third example set of rules that a storage controller may evaluate when recording content in a network controlled content recording system that uses a combination of network and local storage. The storage controller may be the storage controller of the systems of FIGS. 1 and/or 3.

FIG. 4C depicts a third example set of rules 430C that a storage controller may evaluate when recording content in a network controlled content recording system that uses a combination of network and local storage. The storage controller may be the storage controller of the systems 100, 300 of FIGS. 1 and/or 3.

In this example, the set of rules 430C includes a first group of procedures related to specific recording instructions and a second group of procedures related to series recording instructions. Both sets of procedures instruct storing in local storage unless there is insufficient storage space in local storage.

Figure 4D:
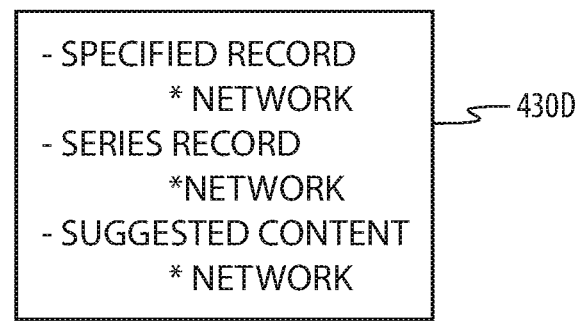
FIG. 4D depicts a fourth example set of rules that a storage controller may evaluate when recording content in a network controlled content recording system that uses a combination of network and local storage. The storage controller may be the storage controller of the systems of FIGS. 1 and/or 3.

FIG. 4D depicts a fourth example set of rules 430D that a storage controller may evaluate when recording content in a network controlled content recording system that uses a combination of network and local storage. The storage controller may be the storage controller of the systems 100, 300 of FIGS. 1 and/or 3.

In this example, the set of rules 430D includes a first group of procedures related to specific recording instructions, a second group of procedures related to series recording instructions, and a third group of procedures related to suggested content. All three sets of procedures instruct storing in network storage.

Figure 4E:
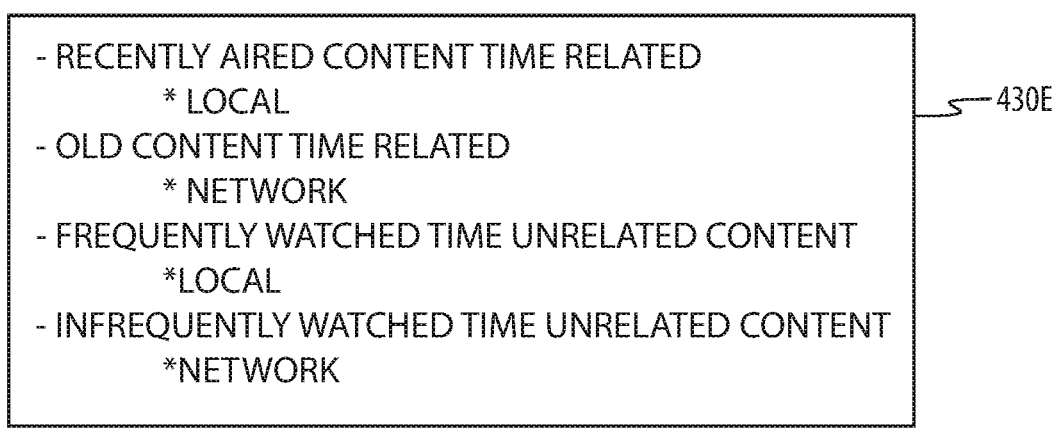
FIG. 4E depicts a fifth example set of rules that a storage controller may evaluate when recording content in a network controlled content recording system that uses a combination of network and local storage. The storage controller may be the storage controller of the systems of FIGS. 1 and/or 3.

FIG. 4E depicts a fifth example set of rules 430E that a storage controller may evaluate when recording content in a network controlled content recording system that uses a combination of network and local storage. The storage controller may be the storage controller of the systems 100, 300 of FIGS. 1 and/or 3.

In this example, the set of rules 430E includes a first group of procedures related to recently (such as within the last week) aired content that is time related and a second group of procedures related to content that is time related and has not recently aired. Further, the set of rules 430E also includes a third group of procedures related to frequently watched time unrelated content and a fourth group of procedures related to infrequently watched time unrelated content.

Time related content may be content that is associated with a specific time or time period. For example, a movie award program may typically only be of interest the week that it airs. Subsequent to that week, users may no longer be interested in the movie award program. Similarly, a football game involving a particular team may only be of interest until the team plays a subsequent game. Conversely, a television program may be of interest more than a week beyond when it airs and/or beyond when the next episode airs. This may be because television programs may follow a story arc between episodes whereas an awards show or a football game may be self-contained. Regardless, any content that is associated with a particular period of time may be considered time related content under a variety of different conditions for a variety of different purposes.

The first group of procedures specifies to store recently aired time related content locally. The second group of procedures specifies to store content that is time related and has not recently aired in network storage. The third group of procedures specifies to record frequently watched time unrelated content locally. The fourth group of procedures specifies to record infrequently watched time unrelated content in network storage.

Figure 4F:
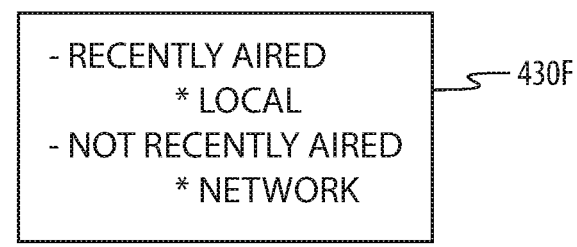
FIG. 4F depicts a sixth example set of rules that a storage controller may evaluate when recording content in a network controlled content recording system that uses a combination of network and local storage. The storage controller may be the storage controller of the systems of FIGS. 1 and/or 3.

FIG. 4F depicts a sixth example set of rules 430F that a storage controller may evaluate when recording content in a network controlled content recording system that uses a combination of network and local storage. The storage controller may be the storage controller of the systems 100, 300 of FIGS. 1 and/or 3.

In this example, the set of rules 430F includes a first group of procedures related to recently aired content and a second group of procedures related to content that has not recently aired. The first group of procedures specifies to store recently aired content locally. The second group of procedures specifies to store content that has not recently aired in network storage.

Figure 5:
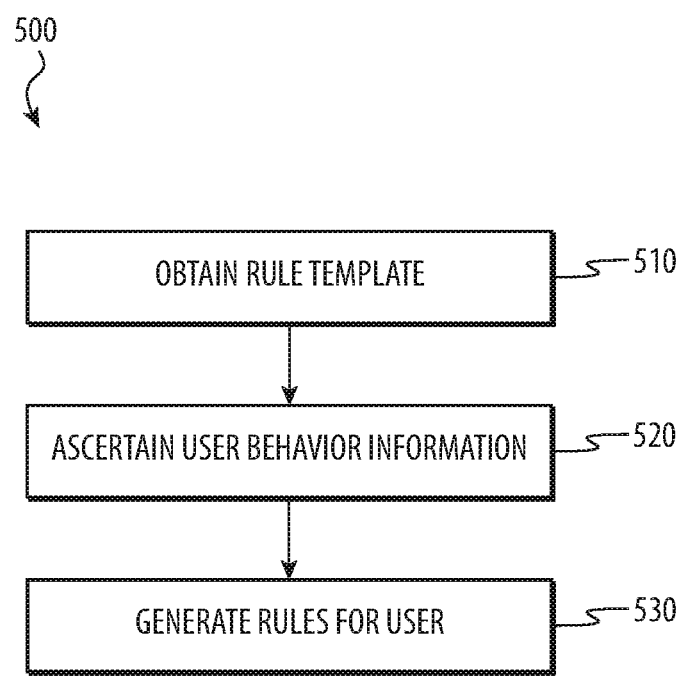
FIG. 5 depicts a flow chart illustrating a first example method for creating a set of rules for network controlled content recording. This method may be performed by the systems of FIGS. 1 and/or 3.

FIG. 5 depicts a flow chart illustrating a first example method 500 for creating a set of rules for network controlled content recording. This method 500 may be performed by the systems 100, 300 of FIGS. 1 and/or 3.

The flow begins at 510 where a rule template is obtained. The rule template may be a set of generic storage rules that are typical to a general population of users. For example, a rule template may specify to record popular content locally and unpopular content in network storage. By way of another example, a rule template may specify to record frequently watched content locally and infrequently watched content in network storage. In still another example, a rule template may specify to record recently aired content locally and content that has not aired recently in network storage. In yet another example, a rule template may specify to record specifically requested content locally and series recordings in network storage.

The flow then proceeds to 520 where user behavior information is ascertained. The user behavior information may be obtained by monitoring user activity, receiving the user behavior information from a device that monitored the user activity, a combination thereof, and so on. Next, the flow proceeds to 530 where rules for the user are generated. The rules for the user may be generated by modifying the obtained rule template using the ascertained user information.

For example, the rule template may specify to store series recordings in network storage. However, the user behavior information may indicate that the user frequently watches series recordings. Further, the user behavior information may indicate that the user frequently watches all episodes of series recordings in a row. As such, the rules of the user may be generated by modifying the rule template with the user behavior information to instruct storage of series recordings locally.

Although the example method 500 is illustrated and described as including particular operations performed in a particular order, it is understood that this is an example. In various implementations, various orders of the same, similar, and/or different operations may be performed without departing from the scope of the present disclosure.

For example, the method 500 is illustrated and described as ascertaining user behavior information after obtaining the rule template. However, it is understood that this is an example. In various implementations, these operations may be performed in reverse order, simultaneously, and so on.

Further, in some examples, generating the rules for the user may include using the rule template without modification using user behavior information. Various configurations are possible and contemplated.

In various examples, this example method 500 may be implemented as a group of interrelated software modules or components that perform various functions discussed herein. These software modules or components may be executed by one or more computing devices, such as the storage controllers 101, 301 of the systems 100, 300 of FIGS. 1 and/or 3.

Figure 6:
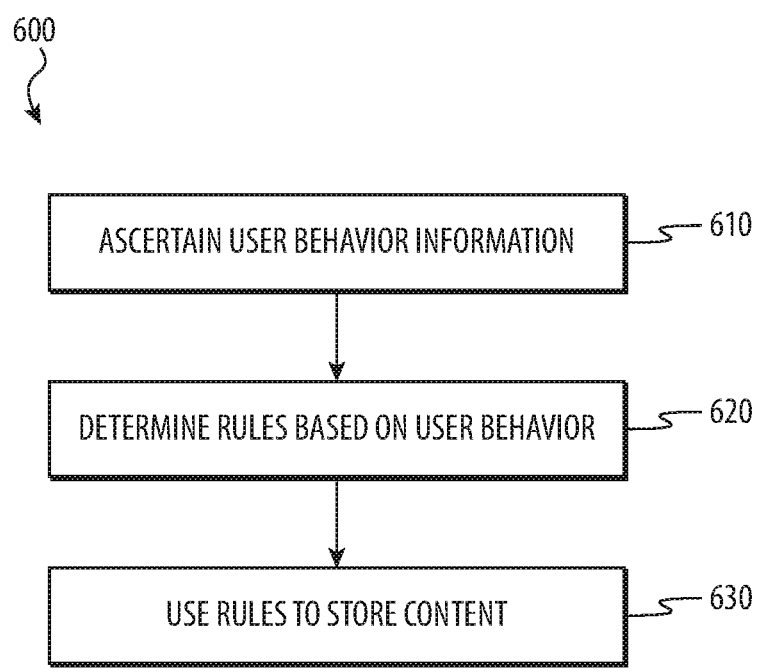
FIG. 6 depicts a flow chart illustrating a second example method for creating a set of rules for network controlled content recording. This method may be performed by the systems of FIGS. 1 and/or 3.

FIG. 6 depicts a flow chart illustrating a second example method 600 for creating a set of rules for network controlled content recording. This method 600 may be performed by the systems 100, 300 of FIGS. 1 and/or 3.

The flow begins at 610 where user behavior information is ascertained. The flow then proceeds to 620 where rules are determined based on the user behavior indicated in the user behavior information. Next, the flow proceeds to 630 where the rules are used to store content.

For example, the user behavior information may indicate that the user frequently watches a first show and infrequently watches a second show. Based on this user behavior information, rules may be generated that instruct recording of the first show locally and the second show in network storage.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 is illustrated and described as determining the rules once based on the user behavior information. However, in various examples, the rules may be generated and then subsequently modified based on updated user behavior information. These modified rules may then be used to store content instead of the originally generated rules. Various configurations are possible and contemplated.

In various examples, this example method 600 may be implemented as a group of interrelated software modules or components that perform various functions discussed herein. These software modules or components may be executed by one or more computing devices, such as the storage controllers 101, 301 of the systems 100, 300 of FIGS. 1 and/or 3.

Figure 7:
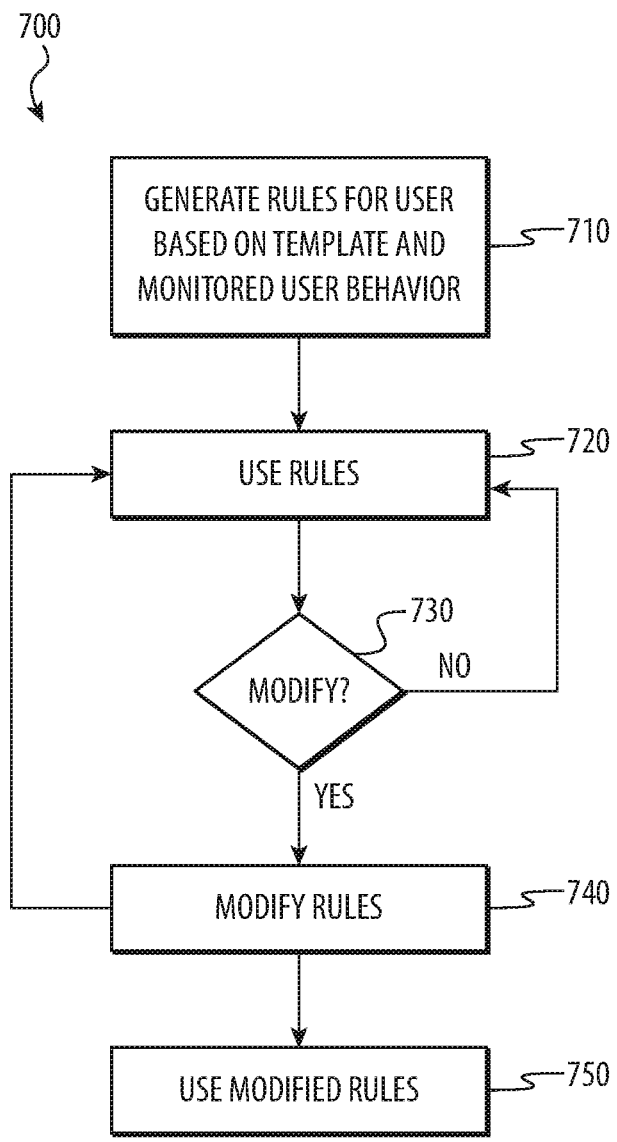
FIG. 7 depicts a flow chart illustrating a third example method for creating a set of rules for network controlled content recording. This method may be performed by the systems of FIGS. 1 and/or 3.

FIG. 7 depicts a flow chart illustrating a third example method 700 for creating a set of rules for network controlled content recording. This method 700 may be performed by the systems 100, 300 of FIGS. 1 and/or 3.

The flow begins at 710 where rules for a user are generated based on a rule template and monitored user behavior. The flow then proceeds to 720 where the rules are used to store content. Next, the flow proceeds to 730 where it is determined whether or not to modify the rules. The rules may be determined to be modified based on changes to the template, changes to the monitored user behavior, and so on. If so, the flow proceeds to 740. Otherwise, the flow returns to 720 where the rules are continued to be used to store content.

At 740, after it is determined to modify the rules, the rules are modified. The flow then proceeds to 750 where the modified rules are used.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as using the rules to store content before determining whether or not to modify the rules. However, in some implementations, the determination whether or not to modify the rules may be made before the rules are ever used to store content. Various configurations are possible and contemplated.

In various examples, this example method 700 may be implemented as a group of interrelated software modules or components that perform various functions discussed herein. These software modules or components may be executed by one or more computing devices, such as the storage controllers 101, 301 of the systems 100, 300 of FIGS. 1 and/or 3.

Figure 8:
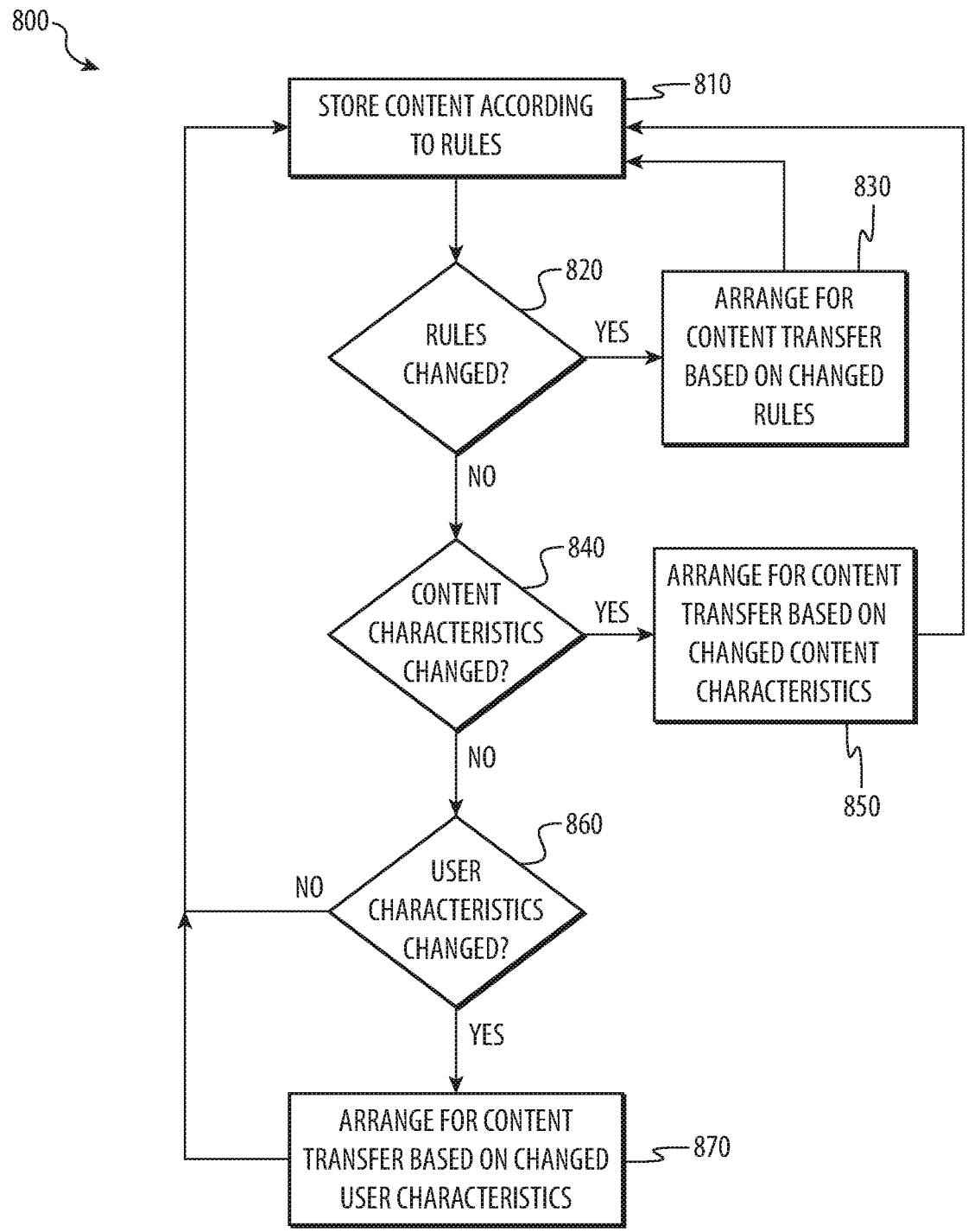
FIG. 8 depicts a flow chart illustrating a second example method for network controlled content recording. This method may be performed by the systems of FIGS. 1 and/or 3.

As described above, storage locations may be reevaluated after content is stored. The content may then be transferred as a result of that reevaluation. For example, FIG. 8 depicts a flow chart illustrating a second example method 800 for network controlled content recording. This method 800 may be performed by the systems 100, 300 of FIGS. 1 and/or 3.

The flow begins at 810 where content is stored according to rules. The flow then proceeds to 820 where it is determined whether or not the rules have changed. If so, the flow proceeds to 830. Otherwise, the flow proceeds to 840.

At 830, content transfer is arranged for based on the changed rules. The flow then returns to 810 where content is stored according to the rules.

At 840, it is determined whether or not content characteristics have changed. If so, the flow proceeds to 850. Otherwise, the flow proceeds to 860.

At 850, content transfer is arranged for based on the changed content characteristics. The flow then returns to 810 where content is stored according to the rules.

At 860, it is determined whether or not user characteristics have changed. If so, the flow proceeds to 870. Otherwise, the flow returns to 810 where content is stored according to the rules.

At 870, content transfer is arranged for based on the changed user characteristics. The flow then returns to 810 where content is stored according to the rules.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as checking for changed rules, content characteristics, and user characteristics and arranging for content transfer for each. However, it is understood that this is an example. In various implementations, various changes that affect the appropriateness of storage locations may be evaluated and handled in any order without departing from the scope of the present disclosure.

In various examples, this example method 800 may be implemented as a group of interrelated software modules or components that perform various functions discussed herein. These software modules or components may be executed by one or more computing devices, such as the storage controllers 101, 301 of the systems 100, 300 of FIGS. 1 and/or 3.

Figure 9:
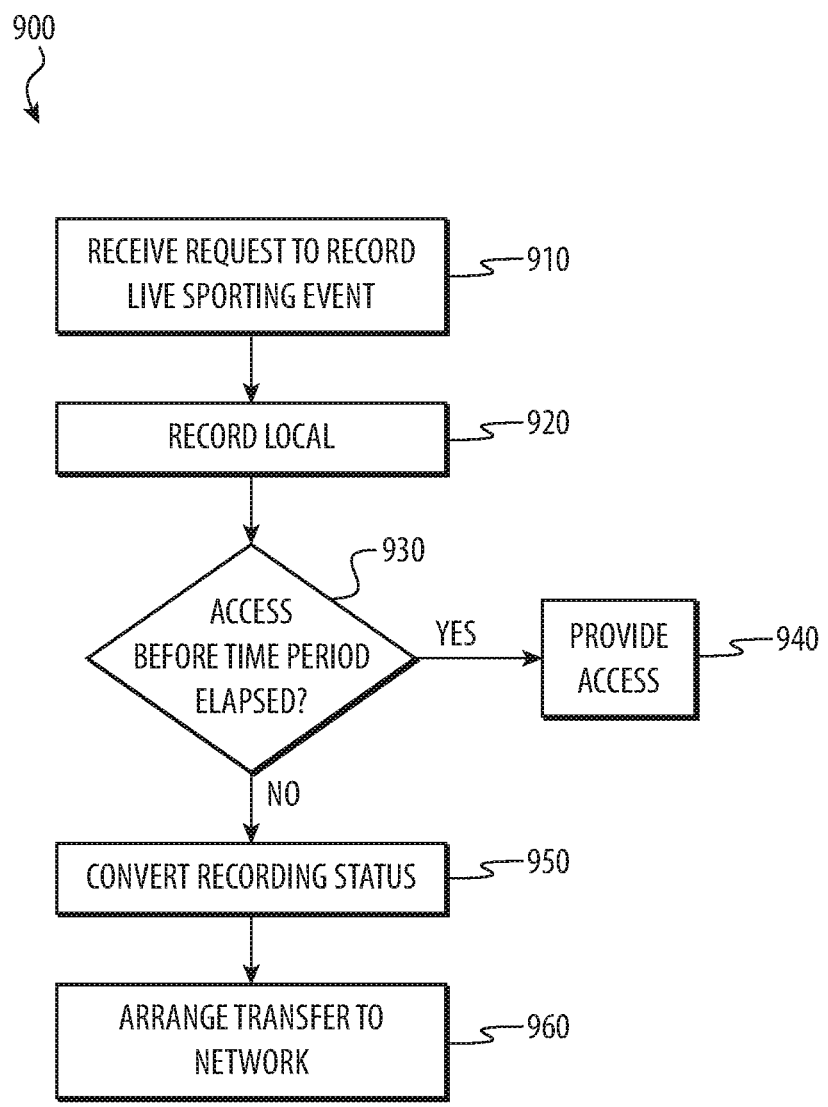
FIG. 9 depicts a flow chart illustrating a third example method for network controlled content recording. This method may be performed by the systems of FIGS. 1 and/or 3.

As described above, the set of rules may specify to record recent time related content to local storage. As also described above, that stored content may later be transferred to network storage once it is no longer recent. For example, FIG. 9 depicts a flow chart illustrating a third example method 900 for network controlled content recording. This method 900 may be performed by the systems 100, 300 of FIGS. 1 and/or 3.

The flow begins at 910 where a request to record a live sporting event is received. The flow proceeds to 920 where the sporting event is recorded locally with a "recent/time relevant" status. Next, the flow proceeds to 930 where it is determined whether or not the recorded sporting event is accessed before a time period (such as three days) has elapsed. If so, the flow proceeds to 940 where access to the recorded sporting event is provided. Otherwise, the flow proceeds to 950.

At 950, after it is determined that the recorded sporting event was not accessed before the time period elapsed, the recording status of the sporting event is changed. The recording status may be changed from "recent/time relevant" to "not recent/time relevant." As such, the flow may proceed to 960 where transfer of the recorded sporting event from local storage to network storage is arranged.

Although the example method 900 is illustrated and described as including particular operations performed in a particular order, it is understood that this is an example. In various implementations, various orders of the same, similar, and/or different operations may be performed without departing from the scope of the present disclosure.

For example, the method 900 is illustrated and described in the context of a live sporting event. However, it is understood that this is an example. In various implementations, the method 900 may be used with a rebroadcast of a recent sporting event and/or any other time related content, such as an awards program, a weather report, and so on. Various configurations are possible and contemplated.

In various examples, this example method 900 may be implemented as a group of interrelated software modules or components that perform various functions discussed herein. These software modules or components may be executed by one or more computing devices, such as the storage controllers 101, 301 of the systems 100, 300 of FIGS. 1 and/or 3.

Although the above illustrates and describes network storage as a single device or group of devices in one or more different cooperative computing arrangements, it is understood that this is an example. In various implementations, network storage may include one or more sets of different storage devices or sets of different group of devices in one or more different cooperative computing arrangements without departing from the scope of the present disclosure. The different sets may include different characteristics and content may be stored to the different sets based on a variety of different criteria.

For example, network storage may include a tiered arrangement of network storage. Such a tiered storage arrangement may include a first tier of network storage with a first characteristic, a second tier with a second characteristic, and so on. For example, a tiered storage arrangement may include a first tier of network storage with a first access speed, a second tier of network storage with a second access speed slower than the first access speed, and a third tier of network storage with a third access speed slower than the second access speed. The set of rules may be configured to store first content that is likely to be accessed in the first tier when stored in network storage, second content that is less likely to be accessed than the first content in the second tier, and third content that is less likely to be accessed than the second content in the third tier.

In other examples, different tiers may have characteristics other than access speed. For example, network storage may be associated with a cost. A first tier may be associated with a first cost, a second tier may be associated with a second cost higher than the first cost, and so on. The set of rules may be configured to favor storage in the first tier over the second tier and so on. Various arrangements are possible and contemplated without departing from the scope of the present disclosure.

Figure 10:
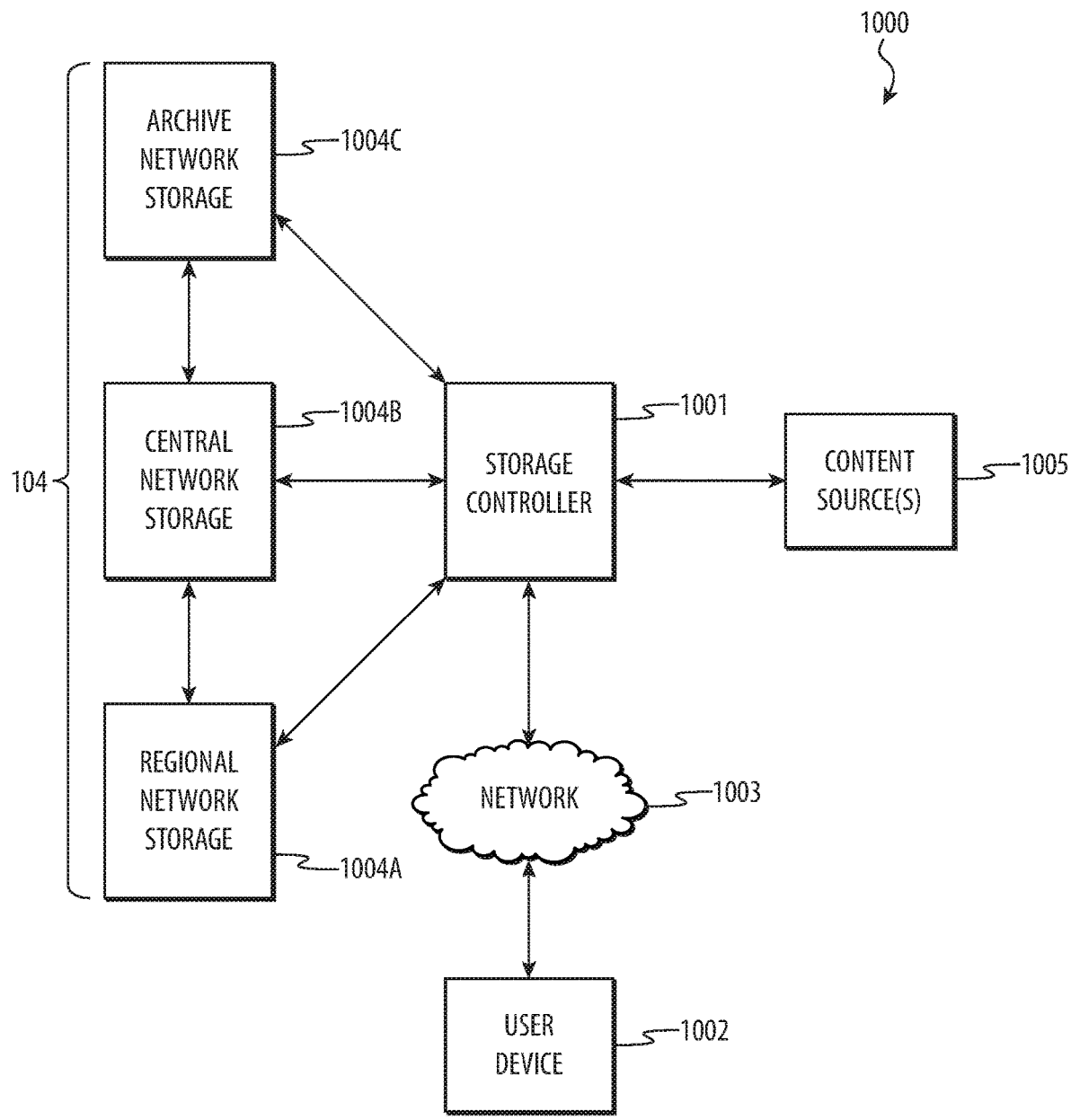
FIG. 10 depicts a third example of a network controlled content recording system that uses a combination of network and local storage where the network storage includes multiple storage tiers.

For example, FIG. 10 depicts a third example of a network controlled content recording system 1000 that uses a combination of network and local storage where the network storage includes multiple storage tiers. The system 1000 includes a storage controller 1001 that is configured to communicate with a user device 1002 via a network 1003. The system 100 also includes a content source 1005 and a network storage 104 that includes a regional network storage 1004A, a central network storage 1004B, and an archive network storage 1004C.

In this example, the regional network storage 1004A may be located in a region corresponding to a location of the user device 1002. For example, the regional network storage 1004A may be located within the same city as the user device 1002 and may be used for any users within that city. The central network storage 1004B may be located within the same state as the user device 1002 and may be used for any users within that state. The archive network storage 1004C may be located within the same country as the user device 1002 and may be used for any users within that country. Thus, the regional network storage 1004A may be a first storage tier, the central network storage 1004B may be a second storage tier, and the archive network storage 1004C may be a third storage tier.

As such, the central network storage 1004B may have a slower access time than the regional network storage 1004A. Similarly, the archive network storage 1004C may have a slower access time than the central network storage 1004B. Therefore, in various implementations, the storage controller 1001 may evaluate a set of rules to store least likely accessed network stored content in the archive network storage 1004C, most likely accessed network stored content in the regional network storage 1004A, and network stored content with likelihoods of being accessed between most likely and least likely in the central network storage 1004B.

Figure 11:
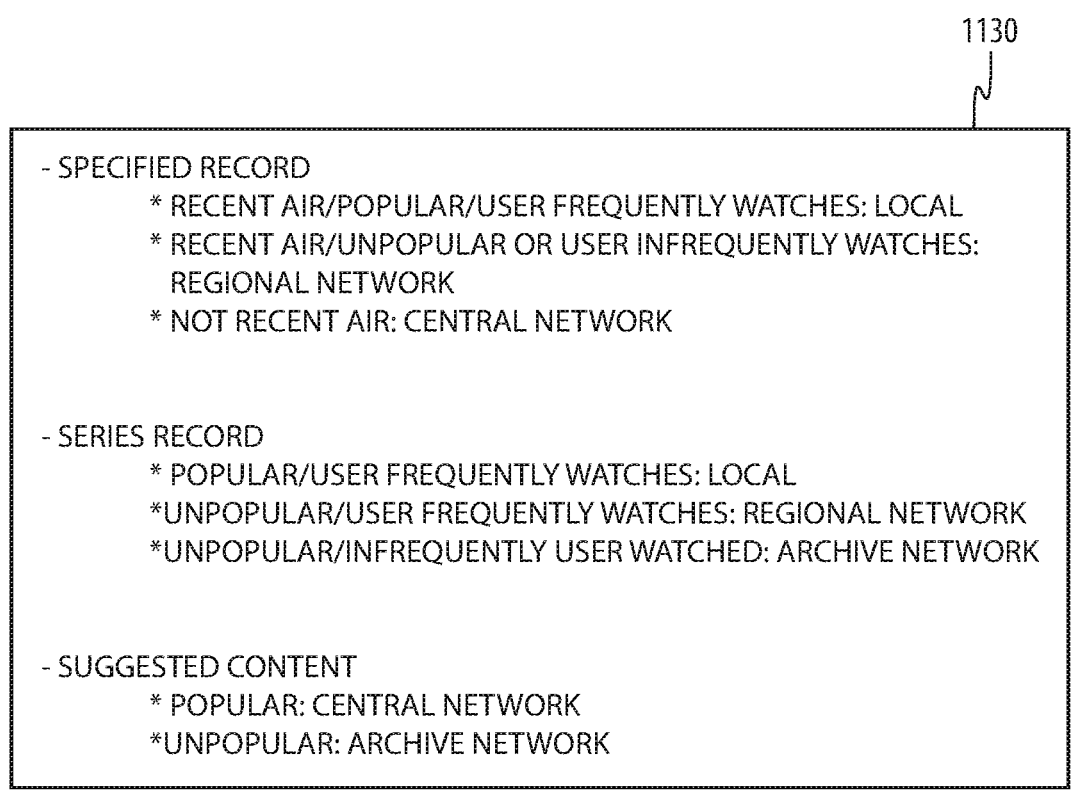
FIG. 11 depicts an example set of rules that the storage controller of the system of FIG. 10 may evaluate when recording content.

For example, FIG. 11 depicts an example set of rules 1130 that the storage controller 1101 of the system 1000 of FIG. 10 may evaluate when recording content. The set of rules 1130 includes a first group of procedures related to specified recordings, a second group of procedures related to series recordings, and a third group of procedures related to suggested content recordings.

The first group of procedures includes a first procedure instructing recording of recently aired and popular specified recording content that the user frequently watches in local storage. The first group of procedures also includes a second procedure instructing recording or recently aired specified recording content that is either unpopular or infrequently watched by the user in regional network storage. Finally, the first group of procedures includes a third procedure instructing storage of specified recording content that has not recently aired in central network storage.

The second group of procedures includes a first procedure instructing storage of popular series recording content that the user frequently watches in local storage. The second group of procedures also includes a second procedure instructing storage of unpopular series recording content that the user frequently watches in regional network storage. Finally, the second group of procedures includes a third procedure instructing storage of unpopular series recording content that the user infrequently watches in archive network storage.

The third group of procedures includes a first procedure instructing storage of popular suggested content in central network storage. The third group of procedures also includes a second procedure instructing storage of unpopular suggested content in archive network storage.

Although the above illustrates and describes use of a single user device, it is understood that this is an example. In various implementations, storing content locally may involve storing content in multiple different user devices under a variety of different circumstances without departing from the scope of the present disclosure.

Figure 12:
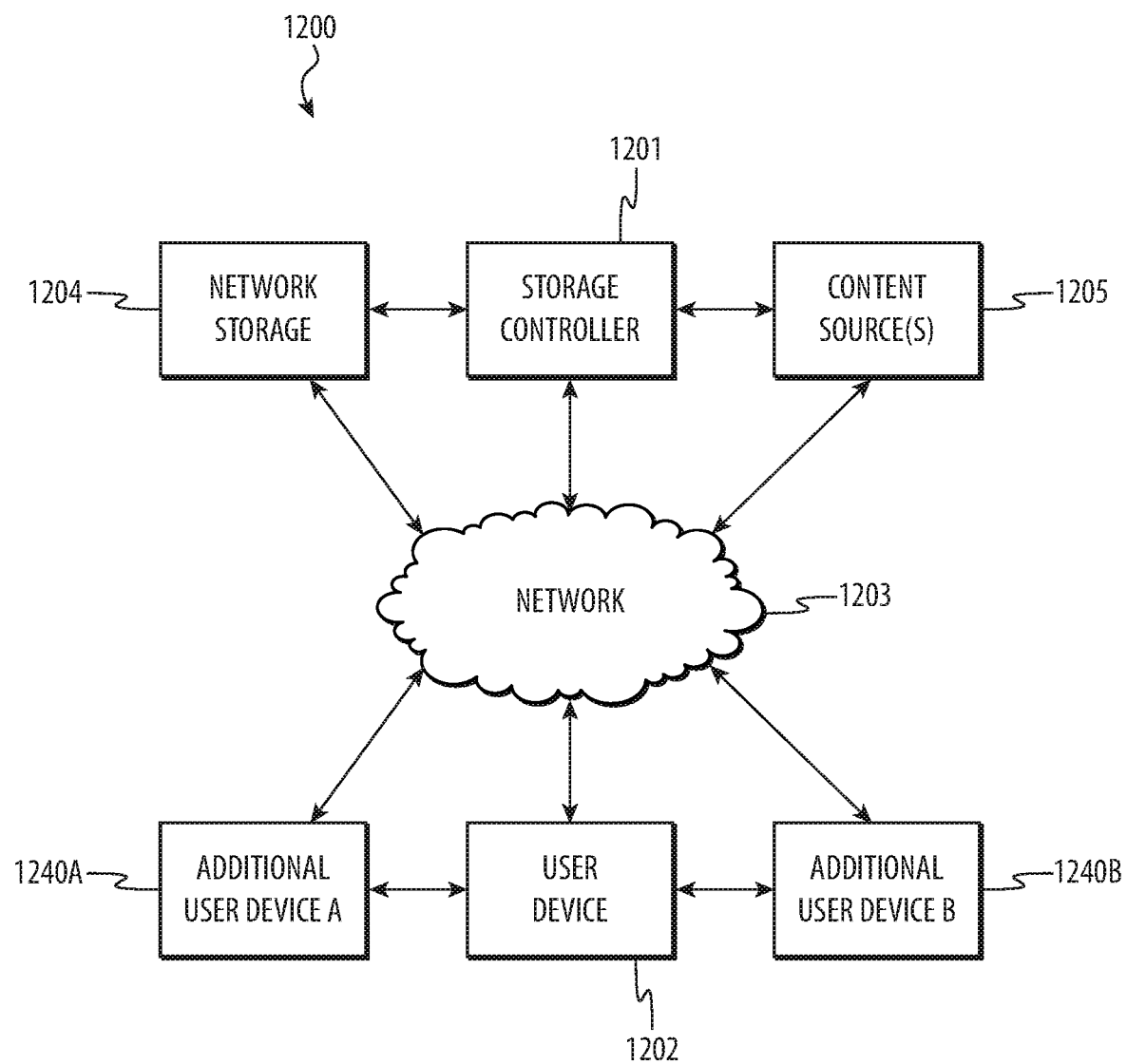
FIG. 12 depicts a fourth example of a network controlled content recording system that uses a combination of network and local storage where the local storage includes multiple user devices.

FIG. 12 depicts a fourth example of a network controlled content recording system 1200 that uses a combination of network and local storage where the local storage includes multiple user devices. The system 1200 includes a storage controller 1201, a user device 1202, a network storage 1204, a content source 1205, an additional user device A 1240A, and an additional user device B 1240B that may be operable to communicate with each other, such as via the network 1203. In this example, the user device 1202 may therefore be a first user device, the additional user device A 1240A may be a second user device, and the additional user device B 1240B may be a third user device.

A set of rules may instruct the storage controller 1201 to locally store content to one or more of the user device 1202, the additional user device A 1240A, and the additional user device B 1240B. The storage controller 1201 may store content to the user device 1202, the additional user device A 1240A, and/or the additional user device B 1240B under different circumstances according to the rules, and for different purposes.

For example, the additional user device A 1240A may be a media storage server located at the same location as the user device 1202. In this example, the storage controller 1201 may use the additional user device A 1240A to store content that is too likely to be accessed for the network storage 1204 but either will not fit within available space on the user device 1202 or is too unlikely to be accessed for the user device 1202. In some situations, access time from the additional user device A 1240A may be faster than the network storage 1204, though perhaps not quite as fast as the user device 1202. Regardless, the additional user device A 1240A may enable expanded local storage for the system 1200 without requiring replacement or hardware modification of the user device 1202.

In this example, the additional user device A 1240A may not be able to present the stored content. The additional user device A 1240A may not be a content access device and/or the content may require specific applications (such as where the content is only accessible through a provider application that is not installed on the additional user device A 1240A) or authorizations (such as where the content is only authorized for use on particular devices that do not include the additional user device A 1240A) for presentation that the additional user device A 1240A does not have. Instead, the additional user device A 1240A may act as a storage repository and the user device 1202 may obtain access to the content stored by the additional user device A 1240A for presentation. Various configurations are possible and contemplated without departing from the scope of the present disclosure.

By way of another example, the additional user device B 1240B may be a mobile computing device. The user may typically watch movies the user records on the mobile computing device. This may be because the user may have time to watch movies only when traveling (such as when the user is flying on an aircraft) and may take the mobile computing device when traveling in order to watch the recorded movies. As such, the storage controller 1201 may store movie content directly to the additional user device B 1240B based on the typical user behavior of using the additional user device B 1240B to access that kind of content.

In this example, the user may behave unusually and attempt to access one of the movies stored on the additional user device B 1240B from the user device 1202. In such a situation, the user device 1202 may obtain the stored movie from the additional user device B 1240B when the movie is requested. Various configurations are possible and contemplated without departing from the scope of the present disclosure.

Figure 13:
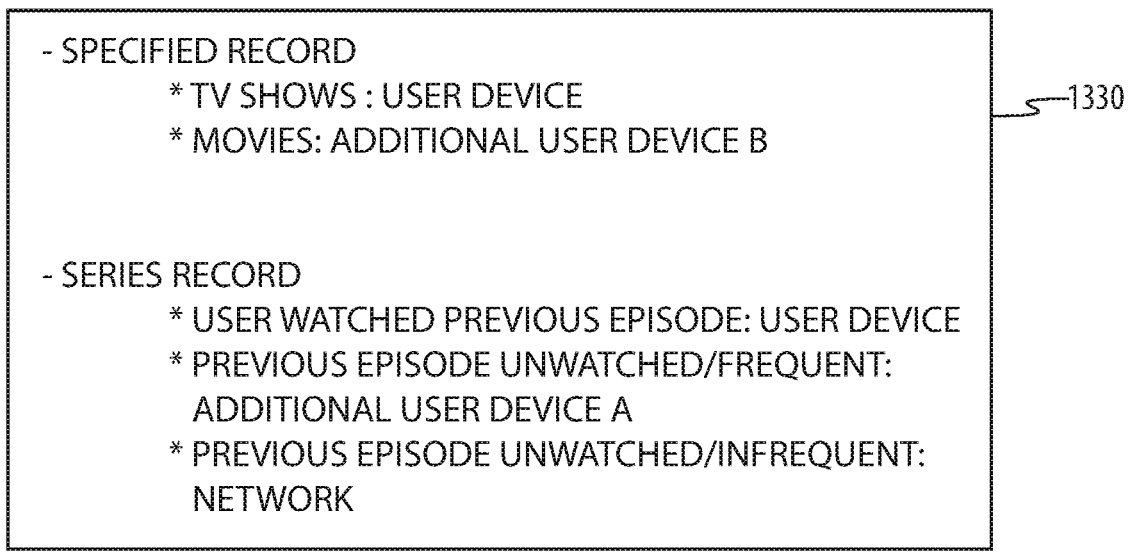
FIG. 13 depicts an example set of rules that the storage controller of the system of FIG. 13 may evaluate when recording content.

FIG. 13 depicts an example set of rules 1330 that the storage controller 1201 of the system 1200 of FIG. 12 may evaluate when recording content. The set of rules 1330 includes a first group of procedures for specified recordings and a second set of procedures for series recordings.

The first group of procedures includes a first procedure instructing storage of television shows to a user device and a second procedure instructing storage of movies to an additional user device B.

The second group of procedures includes a first procedure specifying to record episodes related to a series recording on the user device if the user has watched the previous episode. The second group of instructions also includes a second procedure specifying to record episodes related to a series recording on an additional user device A if the user has not watched the previous episode but the user frequently watches the series. Finally, the second group of instructions includes a third procedure specifying to record episodes related to a series recording on network storage if the user has not watched the previous episode and the user does not frequently watch the series.

After episodes of the series are stored according to the second group of procedures, the episodes may be moved when the user watches the previous episode and/or begins watching the series more frequently. For example, if the user watches the previous episode for an episode stored on the additional user device A, the episode may be moved to the user device. Similarly, if the user begins watching the series more frequently for an episode stored in network storage, the episode may be moved from network storage to the additional user device A and/or the user device. Various configurations are possible and contemplated without departing from the scope of the present disclosure.

When content is stored locally, copies of the same content may be stored at each user device where users have requested the content to be stored. This may be because individual user devices may not have access to content stored on other user devices. In a network storage situation, content recording requests from different users may instruct multiple copies of the same content to be stored in the same network storage for multiple different users. This may result in redundant copies of content being stored for different users. Though network storage may be more flexible on storage space than user devices, storage would still be more efficient if redundant copies of the same content were not stored.

In some implementations, a storage controller may receive multiple content recording requests for the same content. Instead of storing a copy for each content recording request in individual storage pools in the network storage that each corresponds to different users or user devices, the storage controller may store a single copy of the content in a shared storage pool or area. The storage controller may then allow access to the stored content from the shared storage pool. In some examples, the storage controller may allow access to the stored content from the shared storage pool only to users or user devices that previously submitted a recording request for that content. In this way, storage may be made more efficient. Storage space required to store content may also be minimized, preserving storage resources for storing additional content.

However, content may be subject to copyright or other restrictions that may prohibit storing a single copy of the content and sharing the copy among multiple users or user devices. Other content may be subject to restrictions that do not completely prohibit such sharing, but do place conditions on how that sharing may be performed. As such, in some implementations, a storage controller may perform various procedures for evaluating whether or not duplicate network storage content requests may be stored in a shared area and storing content accordingly.

For example, content may include advertisements. These may include certain time "windows" during which advertisers have paid for the advertisements to be shown with the content. Some content may be restricted from being shared in the above fashion during a particular time window associated with the included advertising. For example, a "C3" time window may include three days from the original date that content was aired. Similarly, a "C7" time window may include seven days from the original date that content was aired.

In a situation where the conditions specified sharing only after the C3 time window, copies of the content may be stored in individual storage pools until after the third day from the air date of the content. Subsequently, the content may be condensed from the individual storage pools to a shared pool, eliminating the redundant copies. The advertisements may also be removed in some cases where conditions on the content permit.

In another example, where the conditions on the content prohibit sharing prior to the C7 time window, the above process may be performed after seven days have elapsed from the original air date. Various configurations are possible and contemplated.

In other examples, conditions may be permitted if advertisements originally included in the content are removed and replaced with different advertisements associated with a current time window associated with the source of the content. In such a situation, the content may be stored in the shared pool and current advertisements may be added prior to allowing access.

In yet another example, conditions may allow content to be stored in a shared storage pool as long as some kind of indicator is stored in the individual storage pool or area of each user or user device that is allowed access to the content stored in the shared storage pool. This may ensure that the user or user device requested recording of the shared content and/or that the user or user device was otherwise authorized to access any instance of the content.

A storage controller may evaluate whether or not shared storage for content is permitted and/or under what conditions shared storage is permitted in a variety of different ways. In some implementations, metadata included in the content may specify whether or not storage may be shared and/or any conditions. In such an implementation, the storage controller may evaluate the metadata of the content to determine whether or not to share storage. In other implementations, various lists may be maintained specifying content that may be shared or not and/or conditions. In those implementations, the storage controller may consult one or more of the lists to locate a specification for the content to determine whether or not to share storage. Various configurations are possible and contemplated without departing from the scope of the present disclosure.

Figure 14:
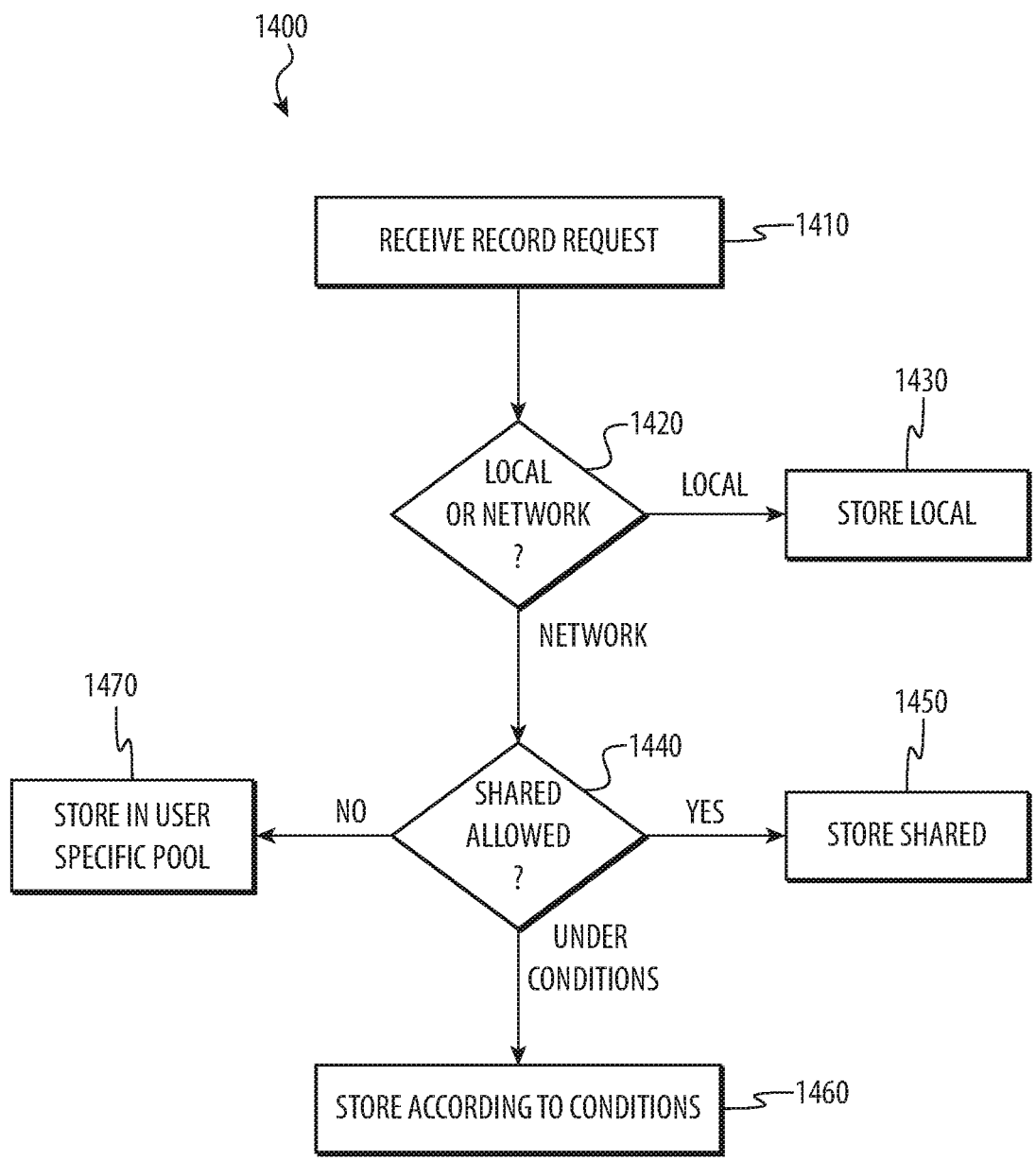
FIG. 14 depicts a flow chart illustrating an example method for managing network content storage. This method may be performed by the systems of FIGS. 1, 3, 10, and/or 12.

By way of example of the above, FIG. 14 depicts a flow chart illustrating an example method 1400 for managing network content storage. This method 1400 may be performed by the systems 100, 300, 1000, 1200 of FIGS. 1, 3, 10, and/or 12.

The flow begins at 1410 where a content recording request is received. The flow then proceeds to 1420 where it is determined whether to record the content in local or network storage. If local, the flow proceeds to 1430 where the content is stored locally. Otherwise, the flow proceeds to 1440.

Recording the content in network storage may result in duplicate copies of the content if stored in individual storage pools for individual users or user devices rather than a single copy in shared storage. Thus, at 1440, after it is determined to store the content in network storage, it is determined whether or not storing the content in a shared pool is allowed.

If storing the content in a shared pool is allowed, the flow proceeds to 1450 where the content is stored in the shared pool. Otherwise, if storage in a shared pool is allowed only under certain conditions, the flow proceeds to 1460 where the content is stored in the shared pool according to the applicable conditions. Otherwise, if storing the content in a shared pool is not allowed, the flow proceeds to 1470 where the content is stored in an individual storage pool specific to a user and/or user device associated with the content recording request.

Although the example method 1400 is illustrated and described as including particular operations performed in a particular order, it is understood that this is an example. In various implementations, various orders of the same, similar, and/or different operations may be performed without departing from the scope of the present disclosure.

For example, the method 1400 assumes for the purposes of simplicity that recording of content in an individual storage pool in network storage would result in storage of redundant copies of the content. However, in some situations, this storage may be the only copy in network storage and no determination of whether or not to store in a shared pool may be required. In such an example, the content may be stored in network storage without any sharing determination. If a subsequent content recording request for that same content would then possibly create a duplicate copy in another individual storage pool, the determination may then be made regarding whether or not the copy can be moved from the individual storage pool to a shared pool and shared for the respective content recording requests. Various configurations are possible and contemplated without departing from the scope of the present disclosure.

In various examples, this example method 1400 may be implemented as a group of interrelated software modules or components that perform various functions discussed herein. These software modules or components may be executed by one or more computing devices, such as the storage controllers 101, 301, 1001, 1201 of the systems 100, 300, 1000, 1200 of FIGS. 1, 3, 10, and/or 12.

Figure 15A:
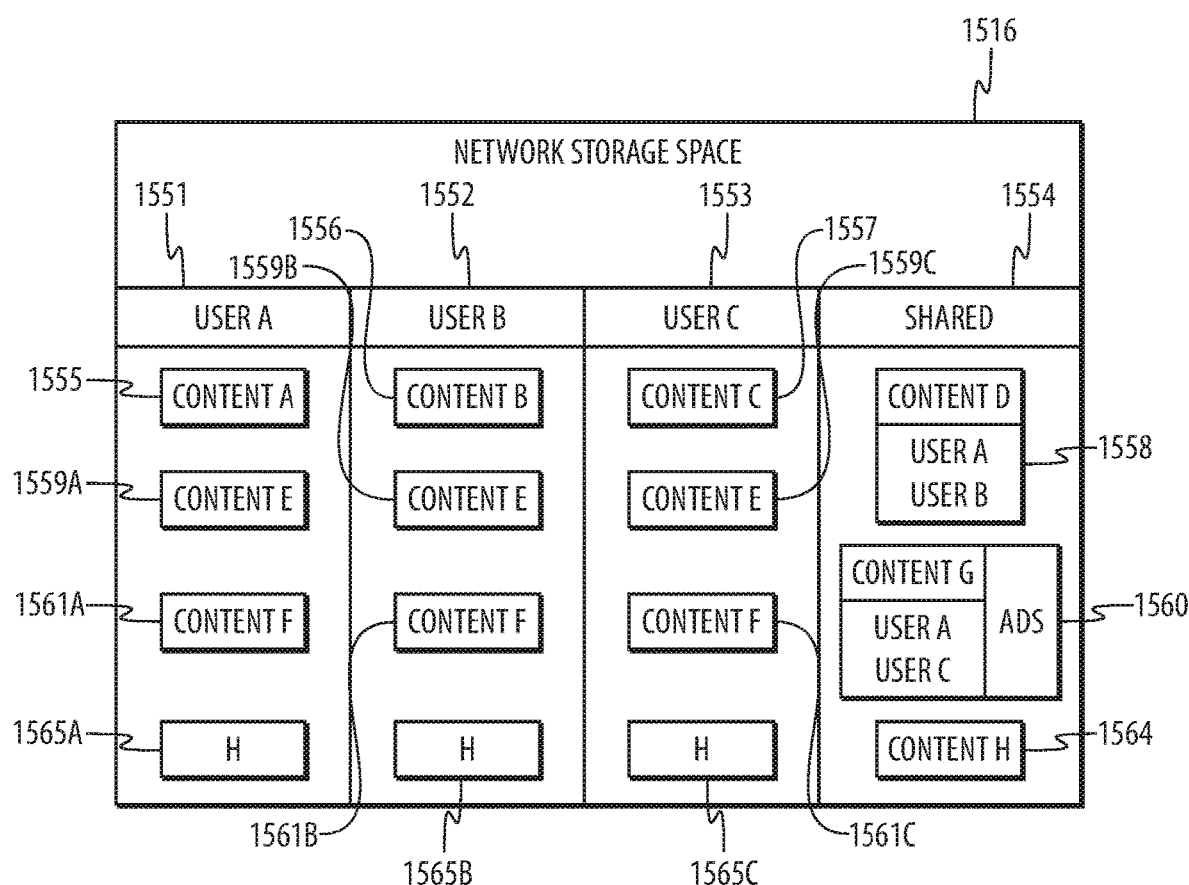
FIG. 15A depicts an example of network storage space that may be managed according to the method of FIG. 14.

FIG. 15A depicts an example of network storage space 1516 that may be managed according to the method 1400 of FIG. 14. The network storage space 1516 includes a first storage pool 1551 associated with an individual user A, a second storage pool 1552 associated with an individual user B, a third storage pool 1553 associated with an individual user C, and a shared storage pool 1554.

FIG. 15A depicts the network storage space 1516 after performance of content storage for a number of content recording requests. User A requested recording of Content A, Content D, Content E, Content F, Content G, and Content H. User B requested recording of Content B, Content D, Content E, Content F, and Content H. User C requested recording of Content C, Content E, Content F, Content G, and Content H. In a system that did not determine whether or not storing shared content was allowed, this could result in duplicate copies of Content D in the first storage pool 1551 and the second storage pool 1552; duplicate copies of Content E in the first storage pool 1551, the second storage pool 1552, and the third storage pool 1553; duplicate copies of Content Gin the first storage pool 1551 and the third storage pool 1553; and duplicate copies of Content H in the first storage pool 1551, the second storage pool 1552, and the third storage pool 1553. However, as the network storage space 1516 may be managed according to the method such as the method 1400 of FIG. 14, some of that duplication may be avoided.

In this example, shared storage is allowed for Content D, prohibited for Content E, allowed under a first set of conditions for Content F, allowed under a second set of conditions for Content G, and allowed under a third set of conditions for Content H. The first set of conditions for shared storage of Content F specify in this example that shared storage is prohibited during the C3 window but is allowed after the C3 window if updated or current advertisements are added. The second set of conditions for shared storage of Content G specify in this example that shared storage is allowed as long as advertisements are stored with the shared copy of Content G and replaced with updated or current advertisements associated with a current advertising time window. The third set of conditions for Content H specify that shared storage is allowed as long as pointers to the shared copy are stored in the individual storage pool of every user who has requested storage of Content H.

Thus, a Content A copy 1555 is stored in the first storage pool 1551, a Content B copy 1556 is stored in the second storage pool 1552, and a Content C copy 1557 is stored in the third storage pool 1553. Duplicate Content E copies 1559A, 1559B, and 1559C are stored in the first storage pool 1551, the second storage pool 1552, and the third storage pool 1553. Similarly, Duplicate Content F copies 1561A, 1561B, and 1561C are stored in the first storage pool 1551, the second storage pool 1552, and the third storage pool 1553. Further, a shared Content D copy 1558, a shared Content G copy 1560, and a Shared Content H copy 1564 are stored in the shared storage pool 1554. Additionally, a first pointer 1565A to the Shared Content H copy 1564 is stored in the first storage pool 1551, a second pointer 1565B to the Shared Content H copy 1564 is stored in the second storage pool 1552, and a third pointer 1565C to the Shared Content H copy 1564 is stored in the third storage pool 1553.

As shown, the shared Content D copy 1558 may be indicated as associated with User A and User B to indicate that the shared Content D copy 1558 is associated with content recording requests for User A and User B. The shared Content G copy 1560 is similarly indicated as associated with User A and User C. These indications may be used to determine whether or not a user may access the shared content. For example, a user who has not submitted a content recording request associated with shared content may not be allowed to access shared content.

Further, the indication that a user is associated with shared content may be removed instead of deleting the shared content when the user requests deletion of the shared content. This may allow a user to delete content for himself while allowing the content to remain for other users. Users may not even be aware that their content is stored in shared storage, or that network storage is even being used at all. If updating the indication would leave a single user associated with the shared content, the content may be removed from the shared storage pool 1554 and stored in the user's individual storage pool instead.

Though this example does not avoid all duplication of content in the network storage space 1516, some duplication is avoided while still obeying restrictions on the content. Further, even some of the duplication that could not be avoided may be reduced at some point.

Figure 15B:
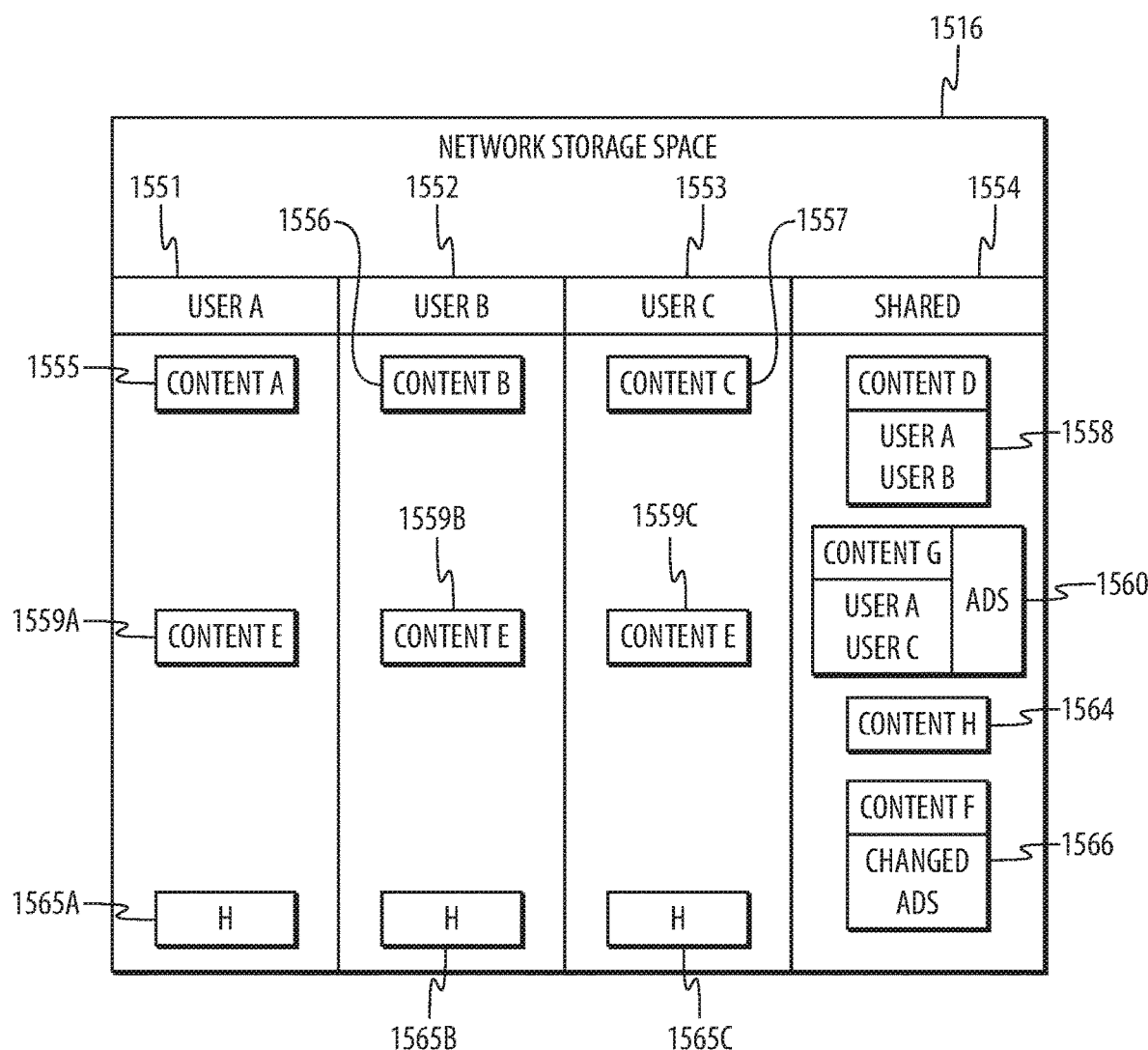
FIG. 15B depicts the network storage space of FIG. 15A after content stored in individual storage pools is consolidated in shared storage.

For example, FIG. 15B depicts the network storage space 1516 of FIG. 15A after content stored in individual storage pools is consolidated in shared storage. As mentioned above, shared storage for Content F is allowed after the C3 window. As such, the duplicate Content F copies 1561A, 1561B, and 1561C may be removed from the first storage pool 1551, the second storage pool 1552, and the third storage pool 1553 after the C3 window and a shared Content F copy F 1556 with changed advertisements corresponding to a current advertising window is stored in the shared storage pool 1554.

Although the above is illustrated and described as storing entire instances of content in various locations, it is understood that these are examples. In some implementations, various portions of content may be stored in one or more different locations. For example, a first portion of an instance of content may be stored in a user device and a second portion of the instance of content may be stored in network storage.

Figure 16:
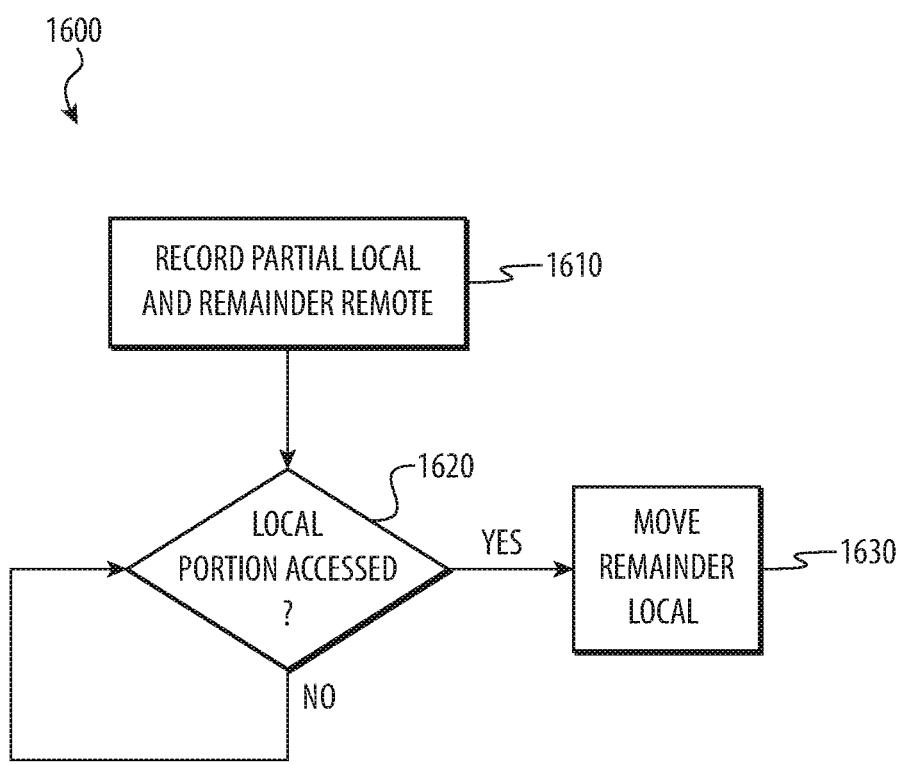
FIG. 16 depicts a flow chart illustrating an example method for managing stored content partially in both local and network storage. This method may be performed by the systems of FIGS. 1, 3, 10, and/or 12.

For example, FIG. 16 depicts a flow chart illustrating an example method 1600 for managing stored content partially in both local and network storage. This method 1600 may be performed by the systems 100, 300, 1000, 1200 of FIGS. 1, 3, 10, and/or 12.

The flow begins at 1610 where part of an instance of content is stored locally while the remainder of the instance of content is stored remotely in network storage. For example, an initial portion of the content may be stored locally that has a duration estimated to be sufficient that the remainder can be requested and obtained before presentation of the initial portion finishes. In some examples, the first ten minutes of content may be stored locally while the remainder of the content is stored remotely in network storage.

The flow then proceeds to 1620 where it is determined whether or not the local portion is accessed. If not, the flow returns to 1620 where it is again determined whether or not the local portion is accessed. Otherwise, the flow proceeds to 1630 where the remainder portion is moved locally.

This combination of local and remote storage for a single instance of content may allow a system to provide quicker access to more content. This may be due to being able to devote local storage to initial portions of content while being able to obtain any of the remainder portions during presentation of the initial portions.

Although the example method 1600 is illustrated and described as including particular operations performed in a particular order, it is understood that this is an example. In various implementations, various orders of the same, similar, and/or different operations may be performed without departing from the scope of the present disclosure.

For example, the method 1620 is illustrated and described as moving a remainder portion to local storage when the local portion is accessed. However, in various examples, access of the local portion may be anticipated based on monitored user behavior. In such an example, the reminder portion may be moved to local storage when access to the local portion is anticipated instead of waiting for the local portion to actually be accessed. This may allow local stored portions to be smaller as transfer of remainder portions may be completed sooner after the local portion is accessed. Various configurations are possible and contemplated without departing from the scope of the present disclosure.

In various examples, this example method 1600 may be implemented as a group of interrelated software modules or components that perform various functions discussed herein. These software modules or components may be executed by one or more computing devices, such as the storage controllers 101, 301, 1001, 1201 of the systems 100, 300, 1000, 1200 of FIGS. 1, 3, 10, and/or 12.

The above illustrates and describes a number of embodiments. In various implementations, various features of these embodiments may be combined. Description of techniques with respect to one embodiment does not imply that they may not be used in implementations with other described embodiments. Various configurations are possible and contemplated without departing from the scope of the present disclosure.

As described above and illustrated in the accompanying figures, the present disclosure relates to a network controlled content recording system that uses a combination of network and local storage. Upon determining to record content for a user, a storage controller of the network controlled content recording system performs an evaluation to determine whether to store the content in a device local to the user or in network storage. The storage controller may then arrange for the content to be recorded accordingly. The storage controller may evaluate a set of rules and/or may evaluate the content, user behavior, characteristics of the user, characteristics of the content, characteristics of a request to record the content, and so on. Subsequently, the storage controller may reevaluate storage locations and direct transfer accordingly. For example, the storage controller may determine that various characteristics related to the user, the content, and so on have changed. When the storage controller determines a change occurs, the storage controller may determine that transfer is appropriate due to that change. In this way, the network controlled content recording system may be capable of providing a virtually unlimited amount of content recording space while providing access to recorded content as quickly and efficiently as possible. The network controlled content recording system may therefore optimize storage, reduce time required to access content, automate storage decisions, improve operating efficiency of the devices included in the system, and reduce system resources used in storing and providing access to content.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A content recording system, comprising:
a non-transitory storage medium that stores instructions; and
a processing unit that executes the instructions to:
receive a content recording request;
evaluate the content recording request; and
determine whether to record content associated with the content recording request in a user device or in a network storage; wherein:
if the content recording request includes a specific instruction to record the content, the processing unit records the content associated with the content recording request in the user device;
otherwise, the processing unit records the content associated with the content recording request in the network storage; and
the content recording request does not include the specific instruction to record the content when the content recording request is a bulk recording request.

2. The content recording system of claim 1, wherein the processing unit determines whether to record the content associated with the content recording request in the user device or in the network storage based on monitored user behavior.

3. The content recording system of claim 1, wherein the user device comprises a smart phone.

4. The content recording system of claim 1, wherein the content associated with the content recording request is more likely to be accessed when the content recording request includes the specific instruction to record the content.

5. The content recording system of claim 1, wherein the content is a first content and the processing unit:
stores a first portion of a second content in the user device;
stores a second portion of the second content in the network storage; and
moves the second portion of the second content to the user device when the first portion of the second content is accessed.

6. The content recording system of claim 1, wherein the processing unit:
determines a change occurs; and
moves the content between the user device and the network storage based on the change.

7. The content recording system of claim 1, wherein the content recording request is received from the user device.

8. The content recording system of claim 1, wherein the user device is a first user device and the content recording request is received from a second user device.

9. A storage controller, comprising:
a non-transitory storage medium that stores instructions; and
a processing unit that executes the instructions to:
receive a content recording request;
evaluate content associated with the content recording request; and
determine whether to record the content associated with the content recording request in a user device or in a network storage; wherein:
if the content recording request includes a specific instruction to record the content, the processing unit records the content associated with the content recording request in the user device;
otherwise, the processing unit records the content associated with the content recording request in the network storage; and
the content recording request does not include the specific instruction to record the content when the content recording request is a bulk recording request.

10. The storage controller of claim 9, wherein the processing unit further determines whether to record the content associated with the content recording request in the user device or in the network storage based on whether the content is time related.

11. The storage controller of claim 9, wherein the content recording request is received via a cellular network.

12. The storage controller of claim 9, wherein the processing unit further determines whether to record the content associated with the content recording request in the user device or in the network storage based on access of related content.

13. The storage controller of claim 9, wherein the processing unit further determines whether to record the content associated with the content recording request in the user device or in the network storage based on whether the content is related to frequently watched content.

14. The storage controller of claim 9, wherein the processing unit further determines whether to record the content associated with the content recording request in the user device or in the network storage based on a rating of the content.

15. The storage controller of claim 9, wherein the processing unit further determines whether to record the content associated with the content recording request in the user device or in the network storage based on an air date of the content.

16. The storage controller of claim 9, wherein the processing unit further determines whether to record the content associated with the content recording request in the user device or in the network storage based on user behavior with respect to related content.

17. A content recording system, comprising:
  a non-transitory storage medium that stores instructions; and
  a processing unit that executes the instructions to:
    receive a content recording request;
    evaluate the content recording request;
    determine whether to record content associated with the content recording request in a user device or in a network storage; and
    upon determining to record the content associated with the content recording request in the network storage:
      determine that recording the content associated with the content recording request in an individual storage pool associated with the content recording request in the network storage would result in a duplicate copy;
      determine whether shared storage of the content is allowed; and
      when shared storage of the content is allowed, store the content in a shared storage pool in the network storage.

18. The content recording system of claim 17, wherein the processing unit stores the content in the individual storage pool associated with the content recording request if shared storage of the content is not allowed.

19. The content recording system of claim 18, wherein the processing unit moves the content from the individual storage pool to the shared storage pool in the network storage upon expiration of a period of time.

20. The content recording system of claim 17, wherein the processing unit replaces an advertisement included in the content stored in the network storage with a current advertisement.

* * * * *